(12) United States Patent
Xu et al.

(10) Patent No.: US 12,471,063 B2
(45) Date of Patent: Nov. 11, 2025

(54) SIDELINK RESOURCE DETERMINING METHOD, APPARATUS, AND SYSTEM

(71) Applicant: HUAWEI TECHNOLOGIES CO., LTD., Shenzhen (CN)

(72) Inventors: Haibo Xu, Beijing (CN); Xiao Xiao, Shenzhen (CN); Dongdong Wei, Shanghai (CN); Jun Wang, Shanghai (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 665 days.

(21) Appl. No.: 17/630,204

(22) PCT Filed: Aug. 17, 2020

(86) PCT No.: PCT/CN2020/109626
§ 371 (c)(1),
(2) Date: Jan. 26, 2022

(87) PCT Pub. No.: WO2021/032064
PCT Pub. Date: Feb. 25, 2021

(65) Prior Publication Data
US 2022/0295450 A1 Sep. 15, 2022

(30) Foreign Application Priority Data
Aug. 16, 2019 (CN) .......................... 201910760444.8

(51) Int. Cl.
*H04W 72/02* (2009.01)
*H04L 1/08* (2006.01)
(Continued)

(52) U.S. Cl.
CPC .............. *H04W 72/02* (2013.01); *H04L 1/08* (2013.01); *H04L 1/1812* (2013.01);
(Continued)

(58) Field of Classification Search
CPC ....... H04L 1/08; H04L 1/1812; H04L 5/0053; H04L 1/1864; H04L 2001/0097;
(Continued)

(56) References Cited

U.S. PATENT DOCUMENTS

| 2017/0215183 A1 | 7/2017 | Gulati et al. |
| 2018/0013521 A1 | 1/2018 | Lee et al. |

(Continued)

FOREIGN PATENT DOCUMENTS

| CN | 101119183 A | 2/2008 |
| CN | 104125039 A | 10/2014 |

(Continued)

OTHER PUBLICATIONS

LG Electronics Inc. (Rapporteur), "Report of [103bis#36] SL broadcast, UP aspects (LG)", R2-1818420, 3GPP TSG-RAN WG2 #104, Spokane, USA, Nov. 12-16, 2018, 23 pages.
(Continued)

*Primary Examiner* — Khoa Huynh
(74) *Attorney, Agent, or Firm* — Maier & Maier, PLLC

(57) ABSTRACT

A sidelink resource determining method, an apparatus, and a system, to improve reliability of sidelink data transmission when a first terminal does not receive acknowledgment information for a first data packet from a second terminal. According to the method, when the first terminal determines that the first terminal does not receive the acknowledgment information that is for the first data packet and that is fed back by the second terminal, if the first terminal determines that the second terminal fails to decode the first data packet, the first terminal may determine a sidelink resource used to retransmit the first data packet, so that the first data packet can be retransmitted on the re-determined sidelink resource. In this way, reliability of sidelink transmission is improved. The solution may be applied to fields including unmanned
(Continued)

driving, automated driving, driver assistance, intelligent driving, connected driving, intelligent network driving, car sharing, and artificial intelligence.

18 Claims, 12 Drawing Sheets

(51) Int. Cl.
  *H04L 1/1812* (2023.01)
  *H04L 5/00* (2006.01)
  *H04W 72/0453* (2023.01)
  *H04W 72/56* (2023.01)

(52) U.S. Cl.
  CPC ....... *H04L 5/0053* (2013.01); *H04W 72/0453* (2013.01); *H04W 72/56* (2023.01)

(58) Field of Classification Search
  CPC ... H04L 1/1822; H04L 1/1896; H04L 1/1893; H04L 1/1607; H04W 72/02; H04W 72/0453; H04W 72/56
  See application file for complete search history.

(56) References Cited

U.S. PATENT DOCUMENTS

| | | |
|---|---|---|
| 2018/0049084 A1 | 2/2018 | Lee et al. |
| 2018/0279275 A1 | 9/2018 | Chen et al. |
| 2018/0287744 A1 | 10/2018 | Sundararajan et al. |
| 2019/0058986 A1 | 2/2019 | Loehr et al. |
| 2019/0229853 A1 | 7/2019 | Lee et al. |
| 2020/0351855 A1* | 11/2020 | Kung ............... H04L 1/1887 |
| 2021/0376959 A1* | 12/2021 | Yang ............... H04L 1/1896 |
| 2022/0007403 A1* | 1/2022 | Li ............... H04W 4/40 |

FOREIGN PATENT DOCUMENTS

| | | |
|---|---|---|
| CN | 107645774 A | 1/2018 |
| CN | 108029122 A | 5/2018 |
| CN | 108347313 A | 7/2018 |
| CN | 109479262 A | 3/2019 |
| CN | 109792594 A | 5/2019 |
| CN | 111148077 A | 5/2020 |
| CN | 111431674 A | 7/2020 |
| WO | 2019149182 A1 | 8/2019 |

OTHER PUBLICATIONS

OPPO, "Mode 1 resource allocation for NR SL", R1-1906473, 3GPP TSG RAN WG1 #97, Reno, USA, May 13-17, 2019, 7 pages.

Lenovo et al., "SL HARQ operation", R2-1906733, resubmission of R2-1904159, 3GPP TSG RAN WG2 Meeting #106, Reno, USA, May 13-17, 2019, 4 pages.

* cited by examiner

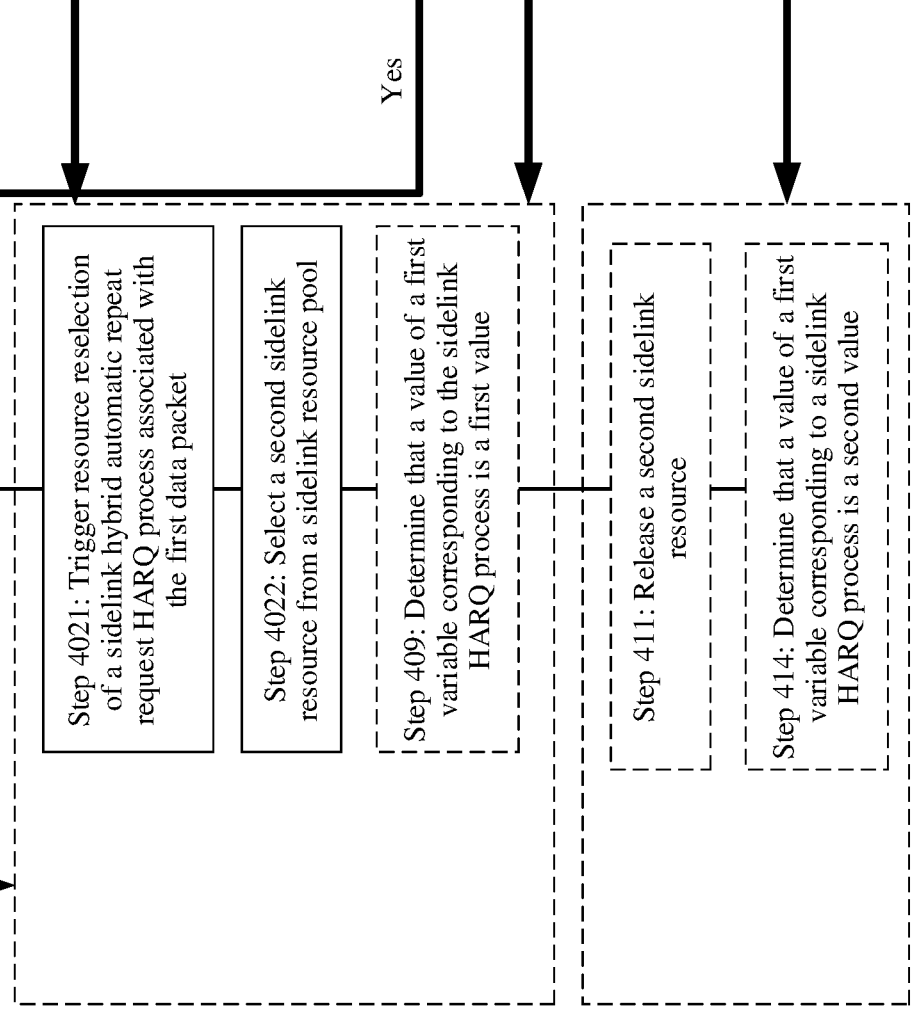

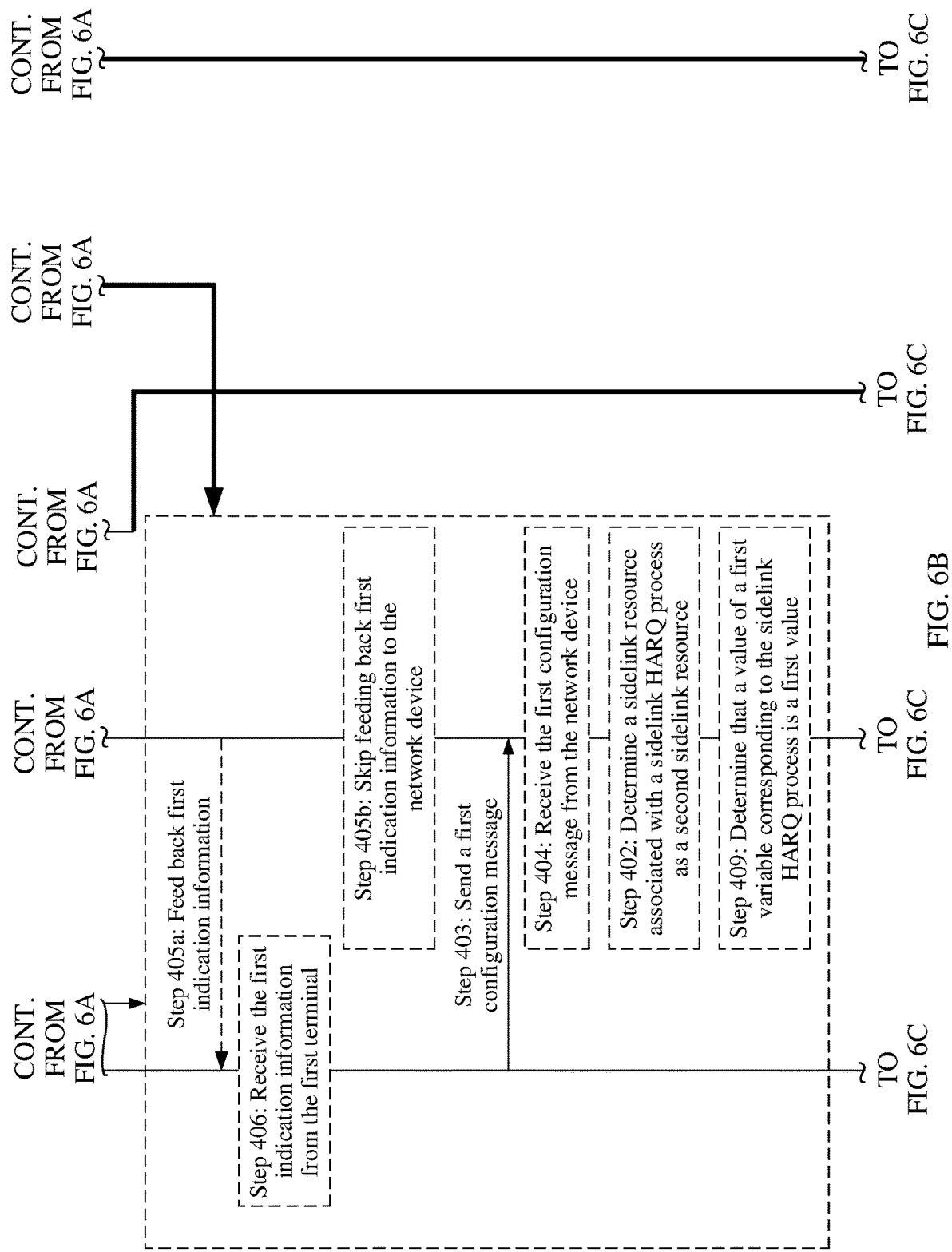

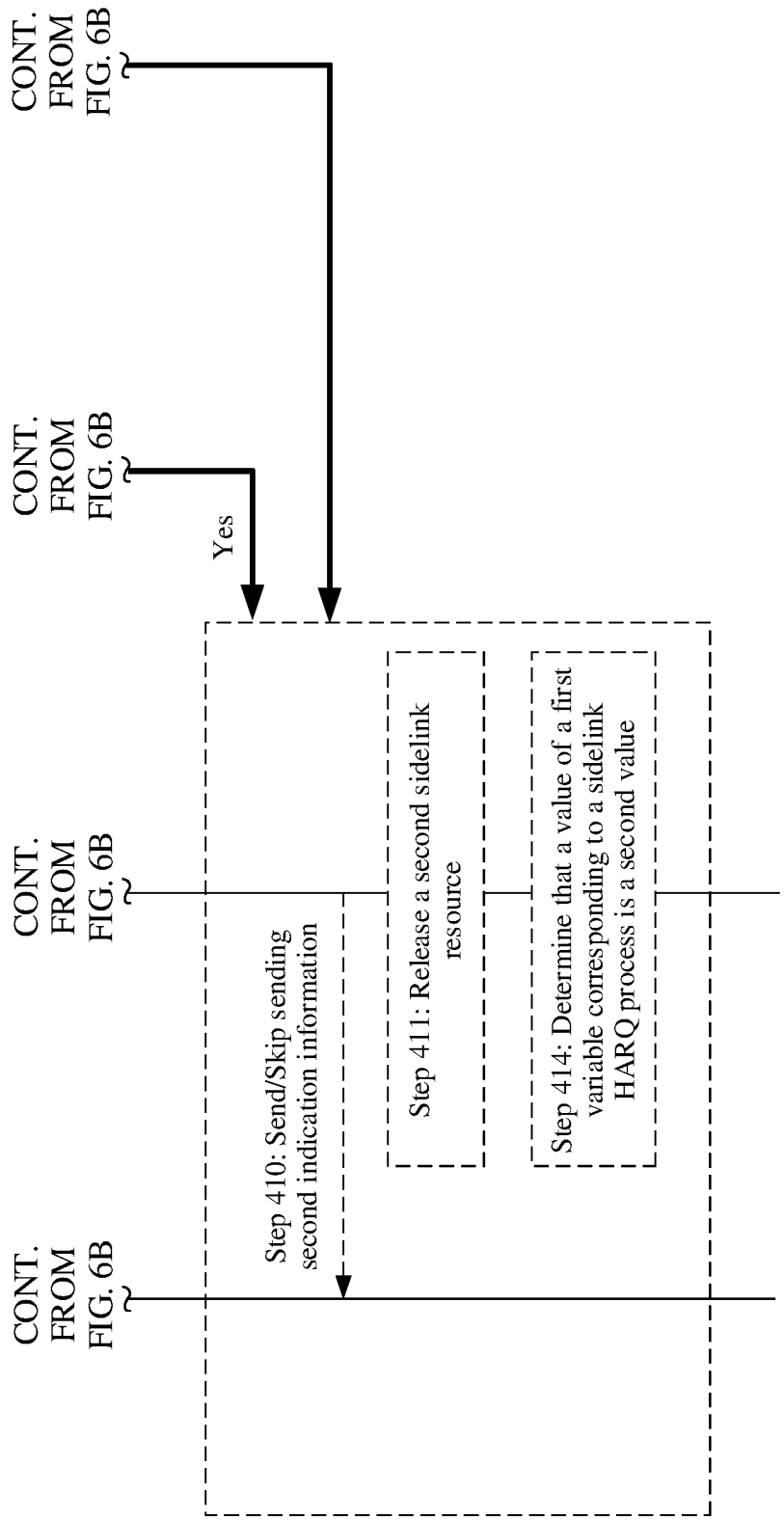

SIDELINK RESOURCE DETERMINING METHOD, APPARATUS, AND SYSTEM

This application is a national stage of International Application No. PCT/CN2020/109626, filed on Aug. 17, 2020, which claims priority to Chinese Patent Application No. 201910760444.8, filed on Aug. 16, 2019. Both of the aforementioned applications are hereby incorporated by reference in their entireties.

TECHNICAL FIELD

Embodiments relate to the field of communications technologies, and in particular, to a sidelink resource determining method, an apparatus, and a system.

BACKGROUND

In a long term evolution (LTE) system or a new radio (NR) system, a communications interface between terminals may be referred to as a PC5 interface. The PC5 interface is usually used in a scenario such as vehicle-to-everything (V2X) or D2D in which direct communication can be performed between devices. On the PC5 interface, a TX terminal may transmit sidelink data to an RX terminal through a sidelink (SL). The RX terminal may send hybrid automatic repeat request (HARQ) information to the TX terminal, to ensure reliability of sidelink data transmission. The HARQ information is used to indicate whether the sidelink data is successfully decoded.

After the TX terminal receives the HARQ information, if the TX terminal determines that the HARQ information indicates that the sidelink data fails to be decoded, the TX terminal may re-determine a sidelink resource used to retransmit the sidelink data.

However, there may be a case in which the TX terminal fails to receive the HARQ information fed back by the RX terminal. When the TX terminal does not receive the HARQ information fed back by the RX terminal, how the TX terminal processes subsequent data transmission for the sidelink data that fails to be received is a problem that needs to be urgently resolved.

SUMMARY

Embodiments provide a sidelink resource determining method, an apparatus, and a system, to improve reliability of sidelink data transmission when a first terminal does not receive acknowledgment information for a first data packet from a second terminal.

To achieve the foregoing objective, the embodiments provide the following solutions:

According to a first aspect, an embodiment provides a sidelink resource determining method, including: A first communications apparatus determines that the first communications apparatus does not receive acknowledgment information for a first data packet from a second communications apparatus, where the acknowledgment information is used to indicate whether the second communications apparatus successfully decodes the first data packet, and the first data packet is a data packet transmitted by the first communications apparatus on a first sidelink resource. When the first communications apparatus determines that the second communications apparatus fails to decode the first data packet, the first communications apparatus obtains a second sidelink resource used to retransmit the first data packet.

For example, the first communications apparatus may be a first terminal or a chip disposed in the first terminal, and the second communications apparatus may be a second terminal or a chip disposed in the second terminal.

An embodiment provides a sidelink resource determining method. In an actual process, a first communications apparatus may not send a first data packet to a second communications apparatus, or a first communications apparatus sends a first data packet to a second communications apparatus, and the first communications apparatus does not receive acknowledgment information due to channel quality although the second communications apparatus feeds back the acknowledgment information. How the first communications apparatus handles a subsequent data transmission problem when determining that the first communications apparatus does not receive the acknowledgement information is not described in the conventional technology. Consequently, reliability of sidelink transmission may be reduced. In view of this, in this embodiment, when the first communications apparatus determines that the first communications apparatus does not receive the acknowledgment information for the first data packet from the second communications apparatus, if the first communications apparatus determines that the second communications apparatus fails to decode the first data packet, the first communications apparatus re-obtains a second sidelink resource used to transmit the first data packet, so that the first communications apparatus can subsequently retransmit the first data packet on the second sidelink resource. In this way, reliability of sidelink transmission is improved.

With reference to the first aspect, in a first possible implementation of the first aspect, that the first communications apparatus obtains a sidelink resource used to retransmit the first data packet includes: The first communications apparatus triggers resource reselection in a sidelink hybrid automatic repeat request (HARQ) process associated with the first data packet; and the first communications apparatus selects the second sidelink resource from a sidelink resource pool. In this way, the first communications apparatus can independently select the second sidelink resource.

With reference to the first aspect or the first possible implementation of the first aspect, in a second possible implementation of the first aspect, that the first communications apparatus triggers resource reselection in a sidelink HARQ process associated with the first data packet includes: When the first communications apparatus determines that the first communications apparatus does not send the first data packet to the second communications apparatus at a moment n, the first communications apparatus triggers resource reselection at the moment n. It should be understood that if the first communications apparatus determines that the first communications apparatus does not send the first data packet to the second communications apparatus at the moment n, the first communications apparatus may determine that the second communications apparatus fails to decode the first data packet. Therefore, the first communications apparatus triggers resource reselection at the moment n. After determining that the first communications apparatus does not send the first data packet at the moment at which the first data packet needs to be sent, the first communications apparatus may trigger resource reselection. This can ensure that the first data packet is re-sent as soon as possible by using the reselected sidelink resource. The moment n is a moment at which the first communications apparatus sends the first data packet.

With reference to the first aspect to the second possible implementation of the first aspect, in a third possible implementation of the first aspect, that the first communications apparatus triggers resource reselection in a sidelink HARQ process associated with the first data packet includes: The first communications apparatus triggers resource reselection at a moment n+X, where x is an interval between a time at which the first communications apparatus sends the first data packet and a time at which the first communications apparatus receives the acknowledgment information fed back by the second communications apparatus. In this way, the first communications apparatus can determine an occasion for independently selecting the second sidelink resource.

With reference to the first aspect to the third possible implementation of the first aspect, in a fourth possible implementation of the first aspect, that the first communications apparatus obtains a sidelink resource used to retransmit the first data packet includes: The first communications apparatus receives a first configuration message from a network device, where the first configuration message includes a sidelink resource associated with the sidelink HARQ process. The first communications apparatus determines the sidelink resource associated with the sidelink HARQ process as the second sidelink resource. The first communications apparatus may determine, in a scheduling manner of the network device, the second sidelink resource used for retransmission.

With reference to the first aspect to the fourth possible implementation of the first aspect, in a fifth possible implementation of the first aspect, the method provided in this embodiment further includes: The first communications apparatus feeds back first indication information to the network device, or the first communications apparatus does not feedback first indication information to the network device, where the first indication information indicates that the second communications apparatus fails to decode the first data packet. The first indication information is fed back, so that the network device can determine, based on the first indication information, that the second communications apparatus fails to decode the first data packet, and further determine that the second sidelink resource used for retransmission needs to be allocated to the first communications apparatus. If the first communications apparatus and the network device negotiate with each other in advance, and the second communications apparatus fails to decode the first data packet, the first communications apparatus may not feedback the first indication information. In this case, if the network device determines that the network device does not receive the first indication information from the first communications apparatus, the network device may determine that the second communications apparatus fails to decode the first data packet, and further determine that the second sidelink resource used for retransmission needs to be allocated to the first communications apparatus 20.

With reference to the first aspect to the fifth possible implementation of the first aspect, in a sixth possible implementation of the first aspect, that the first communications apparatus determines that the second communications apparatus fails to decode the first data packet includes: When the first communications apparatus does not receive the acknowledgment information from the second communications apparatus after the first communications apparatus sends the first data packet to the second communications apparatus, the first communications apparatus determines that the second communications apparatus fails to decode the first data packet.

With reference to the first aspect to the sixth possible implementation of the first aspect, in a seventh possible implementation of the first aspect, when a first condition is met, and the first communications apparatus does not receive the acknowledgment information from the second communications apparatus after the first communications apparatus sends the first data packet to the second communications apparatus, the first communications apparatus determines that the second communications apparatus fails to decode the first data packet, where the first condition includes any one or more of the following: That retransmission is required is configured for a first sidelink logical channel in the first data packet, where the first sidelink logical channel is a sidelink logical channel with a highest priority in the first data packet; that retransmission is required is configured for the first communications apparatus; and a random number generated by the first communications apparatus within a first preset range is greater than a first threshold.

With reference to the first aspect to the seventh possible implementation of the first aspect, in an eighth possible implementation of the first aspect, the first communications apparatus determines that a value of a first variable corresponding to the sidelink HARQ process is a first value, where the first value is used to indicate that the second communications apparatus fails to decode the first data packet. The method provided in this embodiment further includes: The first communications apparatus determines that the value of the first variable corresponding to the sidelink HARQ process is the first value, where the first value is used to indicate that the second communications apparatus fails to decode the first data packet.

It should be noted that the method provided in the first aspect of the embodiments may further include the solutions described in a second aspect, a third aspect, and a fourth aspect.

According to a second aspect, an embodiment provides a sidelink resource determining method, including: A first communications apparatus receives acknowledgment information that is for a first data packet from a second communications apparatus and that indicates that the second communications apparatus fails to decode the first data packet. The first communications apparatus determines, based on the acknowledgment information, that the second communications apparatus fails to decode the first data packet. When the first communications apparatus determines that the second communications apparatus fails to decode the first data packet, the first communications apparatus obtains a second sidelink resource used to retransmit the first data packet.

With reference to the second aspect, in a first possible implementation of the second aspect, the first communications apparatus determines that a value of a first variable corresponding to a sidelink HARQ process is a first value, where the first value is used to indicate that the second communications apparatus fails to decode the first data packet. The method provided in this embodiment further includes: The first communications apparatus determines that a value of a first variable corresponding to a sidelink HARQ process is a first value, where the first value is used to indicate that the second communications apparatus fails to decode the first data packet.

For a manner in which the first communications apparatus obtains the second sidelink resource used to retransmit the first data packet in the second aspect, refer to the descriptions in the first aspect. Details are not described herein again.

It should be noted that the method provided in the second aspect of the embodiments may further include the solutions described in the first aspect, a third aspect, and a fourth aspect.

According to a third aspect, an embodiment provides a sidelink resource determining method, including: A first communications apparatus determines that the first communications apparatus does not receive acknowledgment information for a first data packet from a second communications apparatus, where the acknowledgment information is used to indicate whether the second communications apparatus successfully decodes the first data packet. When the first communications apparatus determines that the second communications apparatus successfully decodes the first data packet, the first communications apparatus performs any one of the following steps: The first communications apparatus sends or does not send second indication information to a network device, where the second indication information is used to indicate that the second communications apparatus successfully decodes the first data packet. Alternatively, the first communications apparatus releases a second sidelink resource, where the second sidelink resource is a sidelink resource used to retransmit the first data packet, and the second sidelink resource is allocated by the network device or is a sidelink resource reserved by the first communications apparatus in a sidelink resource pool.

With reference to the third aspect, in a first possible implementation of the third aspect, that the first communications apparatus determines that the second communications apparatus successfully decodes the first data packet includes: When the first communications apparatus does not receive the acknowledgment information from the second communications apparatus after the first communications apparatus sends the first data packet to the second communications apparatus, the first communications apparatus determines that the second communications apparatus successfully decodes the first data packet.

With reference to the third aspect or the first possible implementation of the third aspect, in a second possible implementation of the third aspect, when a second condition is met, and the first communications apparatus does not receive the acknowledgment information from the second communications apparatus after the first communications apparatus sends the first data packet to the second communications apparatus, the first communications apparatus determines that the second communications apparatus successfully decodes the first data packet, where the second condition includes any one of the following: That no retransmission is required is configured for a first sidelink logical channel in the first data packet, where the first sidelink logical channel is a sidelink logical channel with a highest priority in the first data packet; that no retransmission is required is configured for the first communications apparatus; and the first communications apparatus determines that a random number generated within a second preset range is less than a second threshold.

With reference to the third aspect to the second possible implementation of the third aspect, in a third possible implementation of the third aspect, the first data packet is transmitted in a sidelink HARQ process, and the method provided in this embodiment further includes: The first communications apparatus determines that a value of a first variable corresponding to the sidelink HARQ process is a second value, where the second value is used to indicate that the second communications apparatus successfully decodes the first data packet.

It should be noted that the method provided in the third aspect of the embodiments may further include the solutions described in the first aspect, the second aspect, and a fourth aspect.

According to a fourth aspect, an embodiment provides a sidelink resource determining method, including: A first communications apparatus receives acknowledgment information for a first data packet from a second communications apparatus, where the acknowledgment information indicates that the second communications apparatus successfully decodes the first data packet. The first communications apparatus determines, based on the acknowledgment information, that the second communications apparatus successfully decodes the first data packet. The first communications apparatus performs any one of the following steps: The first communications apparatus sends or does not send second indication information to a network device, where the second indication information is used to indicate that the second communications apparatus successfully decodes the first data packet. Alternatively, the first communications apparatus releases a second sidelink resource, where the second sidelink resource is a sidelink resource used to retransmit the first data packet, and the second sidelink resource is allocated by the network device or is a sidelink resource reserved by the first communications apparatus in a sidelink resource pool.

With reference to the fourth aspect, in a first possible implementation of the fourth aspect, the first data packet is transmitted in a sidelink HARQ process, and the method provided in this embodiment further includes: The first communications apparatus determines that a value of a first variable corresponding to the sidelink HARQ process is a second value, where the second value is used to indicate that the second communications apparatus successfully decodes the first data packet.

It should be noted that the method provided in the fourth aspect of the embodiments may further include the solutions described in the first aspect, the second aspect, and the third aspect. In other words, the solutions described in the first aspect, the second aspect, the third aspect, and the fourth aspect may be combined.

According to a fifth aspect, an embodiment provides a communications apparatus. The communications apparatus can implement the method according to any one of the first aspect or the possible implementations of the first aspect, and therefore can also implement beneficial effects according to any one of the first aspect or the possible implementations of the first aspect. The communications apparatus may be a first terminal or may be an apparatus that can support the first terminal in implementing the method according to any one of the first aspect or the possible implementations of the first aspect, for example, a chip applied to the first terminal. The apparatus may implement the foregoing method by software, hardware, or hardware executing corresponding software.

In an example, an embodiment provides a communications apparatus, including a communications unit and a processing unit. The communications unit may be a transceiver or may include one or more modules having an information receiving/sending function, and the processing unit may be a processor or may include one or more modules having a processing function. The processing unit and the communications unit are used as examples below for description.

The processing unit is configured to determine that the communications unit does not receive acknowledgment information for a first data packet from a second terminal, where the acknowledgment information is used to indicate whether the second terminal successfully decodes the first data packet, and the first data packet is a data packet transmitted by the first terminal on a first sidelink resource. When determining that the second terminal fails to decode the first data packet, the processing unit is configured to obtain a second sidelink resource used to retransmit the first data packet.

With reference to the fifth aspect, in a first possible implementation of the fifth aspect, that the processing unit is configured to obtain a sidelink resource used to retransmit the first data packet includes: The processing unit is configured to trigger resource reselection in a sidelink HARQ process associated with the first data packet. The processing unit is configured to select the second sidelink resource from a sidelink resource pool.

With reference to the fifth aspect or the first possible implementation of the fifth aspect, in a second possible implementation of the fifth aspect, that the processing unit is configured to trigger resource reselection in a sidelink HARQ process associated with the first data packet includes: When the processing unit is configured to determine that the communications unit does not send the first data packet to the second terminal at a moment n, the processing unit is configured to trigger resource reselection at the moment n.

With reference to the fifth aspect to the second possible implementation of the fifth aspect, in a third possible implementation of the fifth aspect, that the processing unit is configured to trigger resource reselection in a sidelink HARQ process associated with the first data packet includes: The processing unit is configured to trigger resource reselection at a moment n+X, where x is an interval between a time at which the communications unit sends the first data packet and a time at which the communications unit receives the acknowledgment information fed back by the second terminal.

With reference to the fifth aspect to the third possible implementation of the fifth aspect, in a fourth possible implementation of the fifth aspect, that the processing unit is configured to obtain a sidelink resource used to retransmit the first data packet includes: The communications unit is configured to receive a first configuration message from a network device. Correspondingly, the processing unit is configured to determine, based on the first configuration message, the sidelink resource used to retransmit the first data packet.

With reference to the fifth aspect to the fourth possible implementation of the fifth aspect, in a fifth possible implementation of the fifth aspect, the communications unit is further configured to feedback first indication information to the network device, or the communications unit is further configured to skip feeding back first indication information to the network device, where the first indication information indicates that the second terminal fails to decode the first data packet.

With reference to the fifth aspect to the fifth possible implementation of the fifth aspect, in a sixth possible implementation of the fifth aspect, that the processing unit is configured to determine that the second terminal fails to decode the first data packet includes: When the communications unit is configured to skip receiving the acknowledgment information from the second terminal after the communications unit is configured to send the first data packet to the second terminal, the processing unit is configured to determine that the second terminal fails to decode the first data packet.

With reference to the fifth aspect to the sixth possible implementation of the fifth aspect, in a seventh possible implementation of the fifth aspect, when a first condition is met, and the communications unit is configured to skip receiving the acknowledgment information from the second terminal after the communications unit is configured to send the first data packet to the second terminal, the processing unit is configured to determine that the second terminal fails to decode the first data packet, where the first condition includes any one or more of the following: That retransmission is required is configured for a first sidelink logical channel in the first data packet, where the first sidelink logical channel is a sidelink logical channel with a highest priority in the first data packet; that retransmission is required is configured for the apparatus; and the processing unit determines that a random number generated within a first preset range is greater than a first threshold.

With reference to the fifth aspect to the third possible implementation of the seventh aspect, in an eighth possible implementation of the fifth aspect, the processing unit is configured to determine that a value of a first variable corresponding to the sidelink HARQ process is a first value, where the first value is used to indicate that the second terminal fails to decode the first data packet. The processing unit is further configured to determine that the value of the first variable corresponding to the sidelink HARQ process is the first value, where the first value is used to indicate that the second terminal fails to decode the first data packet.

It should be noted that the apparatus provided in the fifth aspect of the embodiments may further include the solutions described in a sixth aspect, a seventh aspect, and an eighth aspect.

In another example, an embodiment provides a communications apparatus. The communications apparatus may be a first terminal or may be a chip in the first terminal. When the communications apparatus is the first terminal, the communications unit may be a transceiver, and the processing unit may be a processor. The communications apparatus may further include a storage unit. The storage unit may be a memory. The storage unit is configured to store computer program code, where the computer program code includes instructions. The processing unit executes the instructions stored in the storage unit, so that the first terminal implements the sidelink resource determining method according to any one of the first aspect or the possible implementations of the first aspect. When the communications apparatus is the chip in the first terminal, the processing unit may be a processor, and the communications unit may be collectively referred to as a communications interface. For example, the communications interface may be an input/output interface, a pin, a circuit, or the like. The processing unit executes computer program code stored in a storage unit, so that the first terminal implements the sidelink resource determining method according to any one of the first aspect or the possible implementations of the first aspect. The storage unit may be a storage unit (for example, a register or a cache) in the chip, or may be a storage unit (for example, a read-only memory or a random access memory) that is in the first terminal and that is located outside the chip.

Optionally, the processor, the transceiver, and the memory are coupled to each other.

According to a sixth aspect, an embodiment provides a communications apparatus. The communications apparatus can implement the method according to any one of the second aspect or the possible implementations of the second aspect, and therefore can also implement beneficial effects according to any one of the second aspect or the possible implementations of the second aspect. The communications apparatus may be a first terminal or may be an apparatus that can support the first terminal in implementing the method according to any one of the second aspect or the possible implementations of the second aspect, for example, a chip applied to the first terminal. The apparatus may implement the foregoing method by software, hardware, or hardware executing corresponding software.

In an example, an embodiment provides a communications apparatus, including a communications unit and a processing unit. The communications unit may be a transceiver or may include one or more modules having an information receiving/sending function, and the processing unit may be a processor or may include one or more modules having a processing function. The processing unit and the communications unit are used as examples below for description.

The communications unit is configured to receive acknowledgment information that is for a first data packet from a second terminal and that indicates that the second terminal fails to decode the first data packet. The processing unit is configured to determine, based on the acknowledgment information, that the second terminal fails to decode the first data packet. When determining that the second terminal fails to decode the first data packet, the processing unit is configured to obtain a second sidelink resource used to retransmit the first data packet.

With reference to the sixth aspect, in a first possible implementation of the sixth aspect, the processing unit is configured to determine that a value of a first variable corresponding to a sidelink HARQ process is a first value, where the first value is used to indicate that the second terminal fails to decode the first data packet. The processing unit is further configured to determine that the value of the first variable corresponding to the sidelink HARQ process is the first value, where the first value is used to indicate that the second terminal fails to decode the first data packet.

It should be noted that the apparatus provided in the sixth aspect of the embodiments may further include the solutions described in the fifth aspect, a seventh aspect, and an eighth aspect.

For a manner in which the processing unit is configured to obtain the second sidelink resource used to retransmit the first data packet in the sixth aspect, refer to the descriptions in the fifth aspect. Details are not described herein again.

In another example, an embodiment provides a communications apparatus. The communications apparatus may be a first terminal or may be a chip in the first terminal. When the communications apparatus is the first terminal, the communications unit may be a transceiver, and the processing unit may be a processor. The communications apparatus may further include a storage unit. The storage unit may be a memory. The storage unit is configured to store computer program code, where the computer program code includes instructions. The processing unit executes the instructions stored in the storage unit, so that the first terminal implements the sidelink resource determining method according to any one of the second aspect or the possible implementations of the second aspect. When the communications apparatus is the chip in the first terminal, the processing unit may be a processor, and the communications unit may be collectively referred to as a communications interface. For example, the communications interface may be an input/output interface, a pin, a circuit, or the like. The processing unit executes computer program code stored in a storage unit, so that the first terminal implements the sidelink resource determining method according to any one of the second aspect or the possible implementations of the second aspect. The storage unit may be a storage unit (for example, a register or a cache) in the chip, or may be a storage unit (for example, a read-only memory or a random access memory) that is in the first terminal and that is located outside the chip.

Optionally, the processor, the transceiver, and the memory are coupled to each other.

According to a seventh aspect, an embodiment provides a communications apparatus. The communications apparatus can implement the method according to any one of the third aspect or the possible implementations of the third aspect, and therefore can also implement beneficial effects according to any one of the third aspect or the possible implementations of the third aspect. The communications apparatus may be a first terminal or may be an apparatus that can support the first terminal in implementing the method according to any one of the third aspect or the possible implementations of the third aspect, for example, a chip applied to the first terminal. The apparatus may implement the foregoing method by software, hardware, or hardware executing corresponding software.

In an example, an embodiment provides a communications apparatus, including a communications unit and a processing unit. The communications unit may be a transceiver or may include one or more modules having an information receiving/sending function, and the processing unit may be a processor or may include one or more modules having a processing function. The processing unit and the communications unit are used as examples below for description.

The processing unit is configured to determine that the communications unit does not receive acknowledgment information for a first data packet from a second terminal, where the acknowledgment information is used to indicate whether the second terminal successfully decodes the first data packet. When determining that the second terminal successfully decodes the first data packet, the processing unit is configured to perform any one of the following steps: The communications unit sends or does not send second indication information to a network device, where the second indication information is used to indicate that the second terminal successfully decodes the first data packet. Alternatively, the processing unit is configured to release a second sidelink resource, where the second sidelink resource is a sidelink resource used to retransmit the first data packet, and the second sidelink resource is allocated by the network device or is a sidelink resource reserved by the processing unit in a sidelink resource pool.

With reference to the seventh aspect, in a first possible implementation of the seventh aspect, that the processing unit is configured to determine that the second terminal successfully decodes the first data packet includes: When the communications unit does not receive the acknowledgment information from the second terminal after the communications unit sends the first data packet to the second terminal, the processing unit is configured to determine that the second terminal successfully decodes the first data packet.

In a possible implementation, when a second condition is met, and the communications unit does not receive the acknowledgment information from the second terminal after the communications unit sends the first data packet to the second terminal, the processing unit determines that the second terminal successfully decodes the first data packet, where the second condition includes any one of the following: That no retransmission is required is configured for a first sidelink logical channel in the first data packet, where the first sidelink logical channel is a sidelink logical channel with a highest priority in the first data packet; that no retransmission is required is configured for the apparatus; and the processing unit determines that a random number generated within a second preset range is less than a second threshold.

In a possible implementation, the first data packet is transmitted in a sidelink HARQ process, and the processing unit provided in this embodiment is further configured to determine that a value of a first variable corresponding to the sidelink HARQ process is a second value, where the second value is used to indicate that the second terminal successfully decodes the first data packet.

It should be noted that the apparatus provided in the seventh aspect of the embodiments may be further configured to perform the solutions described in the fifth aspect, the sixth aspect, and an eighth aspect.

In another example, an embodiment provides a communications apparatus. The communications apparatus may be a first terminal or may be a chip in the first terminal. When the communications apparatus is the first terminal, the communications unit may be a transceiver, and the processing unit may be a processor. The communications apparatus may further include a storage unit. The storage unit may be a memory. The storage unit is configured to store computer program code, where the computer program code includes instructions. The processing unit executes the instructions stored in the storage unit, so that the first terminal implements the sidelink resource determining method according to any one of the third aspect or the possible implementations of the third aspect. When the communications apparatus is the chip in the first terminal, the processing unit may be a processor, and the communications unit may be collectively referred to as a communications interface. For example, the communications interface may be an input/output interface, a pin, a circuit, or the like. The processing unit executes computer program code stored in a storage unit, so that the first terminal implements the sidelink resource determining method according to any one of the third aspect or the possible implementations of the third aspect. The storage unit may be a storage unit (for example, a register or a cache) in the chip, or may be a storage unit (for example, a read-only memory or a random access memory) that is in the first terminal and that is located outside the chip.

Optionally, the processor, the transceiver, and the memory are coupled to each other.

According to an eighth aspect, an embodiment provides a communications apparatus. The communications apparatus can implement the method according to any one of the fourth aspect or the possible implementations of the fourth aspect, and therefore can also implement beneficial effects according to any one of the fourth aspect or the possible implementations of the fourth aspect. The communications apparatus may be a first terminal or may be an apparatus that can support the first terminal in implementing the method according to any one of the fourth aspect or the possible implementations of the fourth aspect, for example, a chip applied to the first terminal. The apparatus may implement the foregoing method by software, hardware, or hardware executing corresponding software.

In an example, an embodiment provides a communications apparatus, including a communications unit and a processing unit. The communications unit may be a transceiver or may include one or more modules having an information receiving/sending function, and the processing unit may be a processor or may include one or more modules having a processing function. The processing unit and the communications unit are used as examples below for description.

The communications unit is configured to receive acknowledgment information for a first data packet from a second terminal, where the acknowledgment information indicates that the second terminal successfully decodes the first data packet. The processing unit is configured to determine, based on the acknowledgment information, that the second terminal successfully decodes the first data packet. The processing unit is configured to perform any one of the following steps: The communications unit sends or does not send second indication information to a network device, where the second indication information is used to indicate that the second terminal successfully decodes the first data packet. Alternatively, the processing unit is configured to release a second sidelink resource, where the second sidelink resource is a sidelink resource used to retransmit the first data packet, and the second sidelink resource is allocated by the network device or is a sidelink resource reserved by the processing unit in a sidelink resource pool.

With reference to the eighth aspect, in a first possible implementation of the embodiments, the first data packet is transmitted in a sidelink HARQ process, and the processing unit provided in this embodiment is further configured to determine that a value of a first variable corresponding to the sidelink HARQ process is a second value, where the second value is used to indicate that the second terminal successfully decodes the first data packet.

It should be noted that the apparatus provided in the eighth aspect of the embodiments may further include the solutions described in the fifth aspect, the sixth aspect, and the seventh aspect. In other words, the solutions described in the fifth aspect, the sixth aspect, the seventh aspect, and the eighth aspect may be combined.

According to a ninth aspect, an embodiment provides a computer readable storage medium. The computer readable storage medium stores computer programs or instructions. When the computer programs or the instructions are run on a computer, the computer is enabled to perform the sidelink resource determining method according to any one of the first aspect or the possible implementations of the first aspect.

According to a tenth aspect, an embodiment provides a computer readable storage medium. The computer readable storage medium stores computer programs or instructions. When the computer programs or the instructions are run on a computer, the computer is enabled to perform the sidelink resource determining method according to any one of the second aspect or the possible implementations of the second aspect.

According to an eleventh aspect, an embodiment provides a computer readable storage medium. The computer readable storage medium stores computer programs or instructions. When the computer programs or the instructions are run on a computer, the computer is enabled to perform the sidelink resource determining method according to any one of the third aspect or the possible implementations of the third aspect.

According to a twelfth aspect, an embodiment provides a computer readable storage medium. The computer readable storage medium stores computer programs or instructions. When the computer programs or the instructions are run on a computer, the computer is enabled to perform the sidelink resource determining method according to any one of the fourth aspect or the possible implementations of the fourth aspect.

According to a thirteenth aspect, an embodiment provides a computer program product including instructions. When the instructions are run on a computer, the computer is enabled to perform the sidelink resource determining method according to the first aspect or the possible implementations of the first aspect.

According to a fourteenth aspect, a computer program product includes instructions. When the instructions are run on a computer, the computer is enabled to perform the sidelink resource determining method according to the second aspect or the possible implementations of the second aspect.

According to a fifteenth aspect, a computer program product includes instructions. When the instructions are run on a computer, the computer is enabled to perform the sidelink resource determining method according to the third aspect or the possible implementations of the third aspect.

According to a sixteenth aspect, a computer program product includes instructions. When the instructions are run on a computer, the computer is enabled to perform the sidelink resource determining method according to the fourth aspect or the possible implementations of the fourth aspect.

According to a seventeenth aspect, an embodiment provides a communications apparatus, configured to implement the methods according to the possible designs of any one of the first aspect to the fourth aspect. The communications apparatus may be the foregoing first terminal, or an apparatus including the foregoing first terminal. The communications apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing functions.

According to an eighteenth aspect, an embodiment provides a communications apparatus. The communications apparatus includes at least one processor and a communications interface. When the communications apparatus runs, the processor executes the computer execution instructions stored in the communications apparatus, so that the communications apparatus performs the method according to any one of the possible designs of any one of the first aspect to the fourth aspect. For example, the communications apparatus may be a first terminal, or a chip applied to the first terminal.

It should be understood that the communications apparatus described in the eighteenth aspect may further include a bus and a memory. The memory is configured to store code and data. Optionally, the at least one processor, the communications interface, and the memory are coupled to each other.

According to a nineteenth aspect, an embodiment provides a communications system. The communications system includes any one or more of the following: the communications apparatus according to the fifth aspect, the sixth aspect, the seventh aspect, or the eighth aspect and the possible implementations, and a second terminal.

There is a sidelink between the second terminal and the communications apparatus according to the fifth aspect, the sixth aspect, the seventh aspect, or the eighth aspect and the possible implementations.

The communications system may further include a network device.

According to a twentieth aspect, an embodiment provides a communications apparatus. The communications apparatus includes a processor and a storage medium. The storage medium stores instructions, and when the instructions are run by the processor, the method according to the first aspect or the possible implementations of the first aspect is implemented.

According to a twenty-first aspect, an embodiment provides a communications apparatus. The communications apparatus includes a processor and a storage medium. The storage medium stores instructions, and when the instructions are run by the processor, the method according to the second aspect or the possible implementations of the second aspect is implemented.

According to a twenty-second aspect, an embodiment provides a communications apparatus. The communications apparatus includes a processor and a storage medium. The storage medium stores instructions, and when the instructions are run by the processor, the method according to the third aspect or the possible implementations of the third aspect is implemented.

According to a twenty-third aspect, an embodiment provides a communications apparatus. The communications apparatus includes a processor and a storage medium. The storage medium stores instructions, and when the instructions are run by the processor, the method according to the fourth aspect or the possible implementations of the fourth aspect is implemented.

According to a twenty-fourth aspect, an embodiment provides a communications apparatus. The communications apparatus includes one or more modules, configured to implement the methods according to the first aspect, the second aspect, the third aspect, and the fourth aspect, and the one or more modules may correspond to the steps in the methods according to the first aspect, the second aspect, the third aspect, and the fourth aspect.

According to a twenty-fifth aspect, an embodiment provides a chip. The chip includes a processor and a communications interface. The communications interface is coupled to the processor, and the processor is configured to run computer programs or instructions, to implement the method according to the first aspect or the possible implementations of the first aspect. The communications interface is configured to communicate with another module outside the chip.

According to a twenty-sixth aspect, an embodiment provides a chip. The chip includes a processor and a communications interface. The communications interface is coupled to the processor, and the processor is configured to run computer programs or instructions, to implement the method according to the second aspect or the possible implementations of the second aspect. The communications interface is configured to communicate with another module outside the chip.

According to a twenty-seventh aspect, an embodiment provides a chip. The chip includes a processor and a communications interface. The communications interface is coupled to the processor, and the processor is configured to run computer programs or instructions, to implement the method according to the third aspect or the possible implementations of the third aspect. The communications interface is configured to communicate with another module outside the chip.

According to a twenty-eighth aspect, an embodiment provides a chip. The chip includes a processor and a communications interface. The communications interface is coupled to the processor, and the processor is configured to run computer programs or instructions, to implement the method according to the fourth aspect or the possible implementations of the fourth aspect. The communications interface is configured to communicate with another module outside the chip.

The chip provided in this embodiment may further include a memory, configured to store the computer programs or the instructions.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

BRIEF DESCRIPTION OF DRAWINGS

FIG. 4 to FIG. 6A, FIG. 6B, and FIG. 6C each are a schematic flowchart of a sidelink resource determining method according to an embodiment;

DETAILED DESCRIPTION OF THE EMBODIMENTS

Figure 1:
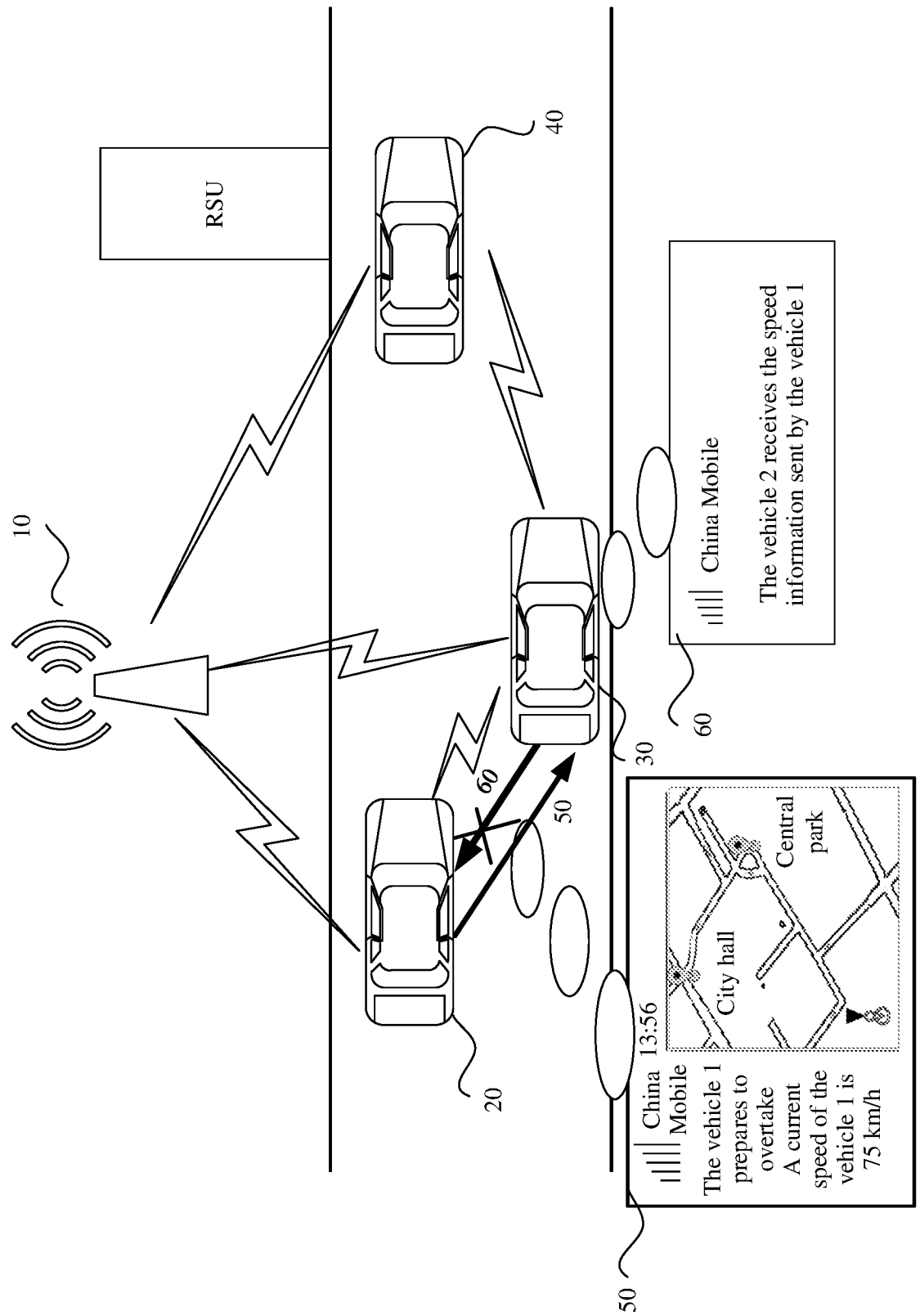
FIG. 1 is an architectural diagram of a communications system according to an embodiment.

Terms such as "first" and "second" are used in the embodiments to distinguish between same items or similar items that have basically same functions and purposes. For example, a first terminal and a first terminal are merely intended to distinguish between different terminals and are not intended to limit a sequence thereof. A person skilled in the art may understand that the terms such as "first" and "second" do not limit a quantity and an execution sequence, and the terms such as "first" and "second" do not indicate a definite difference.

Terms such as "example" or "for example" is used to represent giving an example, an illustration, or descriptions. Any embodiment described as an "example" or "for example" should not be explained as being more preferred or having more advantages than another embodiment or design scheme. Use of the term such as "example" or "for example" is intended to present a relative concept.

"At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof indicates any combination of the following and includes any combination of one or more of the following. For example, at least one of a, b, or c may indicate: a, b, c, a and b, a and c, b and c, or a, b, and c, where a, b, and c may be singular or plural.

The solutions may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a public land mobile network (PLMN) system, a device-to-device (D2D) network system, a machine-to-machine (M2M) network system, and a future 5G communications system.

A network architecture and a service scenario described in the embodiments are intended to describe the solutions in the embodiments more clearly, and do not constitute a limitation on the solutions provided in the embodiments. A person of ordinary skill in the art may understand that with evolution of the network architecture and emergence of a new service scenario, the solutions provided in the embodiments are also applicable to similar problems. In the embodiments, an example in which a provided method is applied to an NR system or a 5G network is used for description.

Before the embodiments are described, terms in the embodiments are first described.

(1) Sidelink (SL): The sidelink is defined for direct communication between terminals, namely, a link for direct communication between a first terminal and a second terminal without forwarding by a network device.

(2) Sidelink resource: The sidelink resource is a resource for transmitting sidelink information (for example, a data packet or a V2X service) between the first terminal and the second terminal on a sidelink.

(3) Sidelink information: The sidelink information is sidelink data or control information transmitted by any two terminals on a sidelink.

The following describes solutions with reference to the accompanying drawings.

FIG. 1 shows a communications system to which a sidelink resource determining method is applied according to an embodiment. The communications system includes one or more network devices (for example, a network device 10 shown in FIG. 1), and one or more terminals (for example, a first terminal 20, a second terminal 30, and a third terminal 40 shown in FIG. 1). In FIG. 1, for example, each terminal 20/30/40 is a vehicle.

The first terminal 20 communicates with the network device 10, the first terminal 20 communicates with the second terminal 30, and the second terminal 30 communicates with the third terminal 40. Certainly, the second terminal 30 and the third terminal 40 may also communicate with the network device 10.

It should be noted that the communications system shown in FIG. 1 may further include a core network and a roadside unit (RSU). The network device 10 may be connected to the core network. The core network may be a 4G core network (for example, an evolved packet core (EPC) network), a 5G core network (5GC), or a core network in various future communications systems. The RSU may further provide various types of service information and data network access for each terminal in the system. For example, the terminal is a vehicle. For example, the RSU may further provide functions such as electronic toll collection and in-vehicle infotainment for each terminal in the system, to greatly improve traffic intelligence.

For example, the core network may be the 4G core network. The network device 10 may be an evolved NodeB (eNB) in a 4G system. The first terminal 20 is a terminal that can perform information transmission with the eNB 10. The eNB 10 accesses the EPC network through an S1 interface.

For example, the core network may be the 5G core network. The network device 10 may be a next generation NodeB (gNB) in an NR system, and the first terminal 20 is a terminal that can perform information transmission with the gNB 10. The gNB 10 accesses the 5GC through an NG interface.

Certainly, the network device 10 may alternatively be a 3rd generation partnership project (3GPP) protocol base station, or may be a non-3GPP protocol base station.

There is a first transmission link between the network device 10 and the first terminal 20. For example, the first transmission link may be a Uu link. There is a second transmission link between the first terminal 20 and the second terminal 30. For example, the second transmission link may be a sidelink.

The first terminal 20 and the second terminal 30 may transmit a V2X service to each other on the sidelink. The V2X service may also be referred to as a first data packet or sidelink information. The first terminal 20 may transmit an uplink (UL) Uu service to the network device 10 on the Uu link, or may receive, on the Uu link, a downlink (DL) Uu service sent by the network device 10.

An interface for direct communication between the first terminal 20 and the second terminal 30 may be an interface 1. For example, the interface 1 may be referred to as a PC5 interface and use an internet of vehicles dedicated frequency band (for example, 5.9 GHz). An interface between the first terminal 20 and the network device 10 may be referred to as an interface 2 (for example, a Uu interface), and use a cellular network frequency band (for example, 1.8 GHz). The PC5 interface is usually used in a scenario such as V2X or D2D in which direct communication can be performed between devices.

Names of the interface 1 and the interface 2 are merely examples. The names of the interface 1 and the interface 2 are not limited in this embodiment.

FIG. 1 shows an example of a scenario according to an embodiment. As shown in FIG. 1, for example, the first terminal 20 is a vehicle 1. If the vehicle 1 determines to perform an overtaking operation, the vehicle 1 may send, on a first sidelink resource, a first data packet (for example, the first data packet may be an overtaking indication and a current speed (for example, 75 km/h) of the vehicle 1) in a dialog box 50 to the second terminal 30 (for example, a vehicle 2) located in front of the vehicle 1, so that the vehicle 2 decelerates after receiving the current speed of the vehicle 1 and the overtaking indication, and the vehicle 1 safely overtakes the vehicle 2. After the vehicle 2 receives the current speed of the vehicle 1 and the overtaking indication, the vehicle 2 may feedback information (namely, an ACK, used to indicate correct receiving) in a dialog box 60 to the vehicle 1. However, although the vehicle 2 may send the information in the dialog box 60 to the vehicle 1, because quality of a channel between the vehicle 2 and the vehicle 1 is less than a threshold, the vehicle 1 fails to receive the ACK fed back by the vehicle 2. Alternatively, when sending the ACK, the vehicle 2 further needs to perform random access or send information about whether the vehicle 2 accelerates or information about the vehicle 2 to the third terminal 40, and consequently gives up feeding back the ACK. The vehicle 1 fails to receive the ACK fed back by the vehicle 2 due to these factors that the vehicle 2 preferentially performs random access or sends the information about whether the vehicle 2 accelerates or the information about the vehicle 2 to the third terminal 40 and gives up transmitting the ACK. In this case, the vehicle 1 determines that the vehicle 1 does not receive the ACK fed back by the vehicle 2. Because the vehicle 1 determines that the vehicle 1 does not receive the ACK fed back by the vehicle 2, the vehicle 1 does not know whether the vehicle 2 successfully performs decoding. In this case, the vehicle 1 needs to re-send the current speed of the vehicle 1 and the overtaking indication to the vehicle 2, to ensure safety during overtaking. Therefore, the vehicle 1 needs to re-obtain a sidelink resource used to transmit the current speed of the vehicle 1 and the overtaking indication.

It should be understood that the scenario in FIG. 1 is merely an example in which the vehicle 1 does not receive the feedback from the vehicle 2 after the vehicle 1 feeds back the current speed of the vehicle 1 and the overtaking indication. In an actual process, when the vehicle 1 prepares to send the current speed and the overtaking indication to the vehicle 2 but gives up sending of the current speed and the overtaking indication to the vehicle 2 due to some factors, the vehicle 1 may also determine that the vehicle 1 does not receive acknowledgment information from the vehicle 2.

The scenario shown in FIG. 1 is merely an example, and another scenario of communication between terminals is also applicable.

Usually, the V2X service is transmitted on a sidelink resource on the sidelink, and the Uu service is transmitted on a Uu resource on the Uu link.

The first terminal 20 obtains a sidelink resource in two allocation manners. One is a resource allocation manner based on scheduling by the network device 10. The network device 10 may schedule the sidelink resource for the first terminal 20. The first terminal 20 may transmit sidelink data or sidelink information to the second terminal 30 on the sidelink resource. The other is an allocation manner in which the first terminal 20 independently selects a resource from a resource pool. The first terminal 20 may independently select a sidelink resource from a preconfigured resource pool or a resource pool configured by the network device 10 by using a system message or dedicated signaling, to transmit sidelink data or sidelink information to the second terminal 30 on the independently selected sidelink resource.

The first terminal 20 or the second terminal 30 is a device having a wireless communication function. The first terminal 20 or the second terminal 30 may be deployed on land, and includes an indoor or outdoor device, a handheld device, or a vehicle-mounted device. Alternatively, the first terminal 20 or the second terminal 30 may be deployed on water (for example, on a ship), or may be deployed in the air (for example, on an airplane, a balloon, or a satellite). The terminal is also referred to as user equipment (UE), a mobile station (MS), a mobile terminal (MT), a terminal device, and the like, and is a device that provides voice and/or data connectivity for a user. For example, the terminal includes a handheld device or a vehicle-mounted device having a wireless connection function. Currently, the terminal may be a mobile phone, a tablet computer, a notebook computer, a palmtop computer, a mobile internet device (MID), a wearable device (for example, a smartwatch, a smart band, or a pedometer), a vehicle-mounted device (for example, an automobile, a bicycle, an electric vehicle, an airplane, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot air balloon, an unmanned aerial vehicle, or an airplane), or the like. In a possible scenario, the terminal device is a terminal device that often operates on the land, for example, a vehicle-mounted device. For ease of description, a chip deployed in the foregoing device, for example, a system-on-a-chip (SOC), a baseband chip, or another chip having a communication function, may also be referred to as a terminal.

The terminal may be a vehicle having a corresponding communication function, a vehicle-mounted communications apparatus, or another embedded communications apparatus, or may be a handheld communications device of a user, including a mobile phone, a tablet computer, or the like.

For example, in the embodiments, the terminal may alternatively be a wearable device. The wearable device may also be referred to as a wearable intelligent device and is a generic term for wearable devices such as glasses, gloves, watches, clothes, and shoes that are developed by applying wearable technologies to intelligent designs of daily wear. The wearable device is a portable device that can be directly worn on a body or integrated into clothes or an accessory of the user. The wearable device is not only a hardware device, but also implements powerful functions through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

The network device 10 is an entity that is used in cooperation with the first terminal 20 and that may be configured to transmit or receive a signal. For example, the network device 10 may be an access point (AP) in a WLAN, or may be an evolved NodeB (eNB) in LTE, a relay station or an access point, a vehicle-mounted device, a wearable device, a network device 10 in a future 5G network, or a network device 10 in a future evolved PLMN network.

In addition, in the embodiments, the network device 10 provides a service for a cell, and the terminal communicates with the network device 10 by using a transmission resource (for example, a time domain resource, a frequency domain resource, or a time-frequency resource) used in the cell. The cell may be a cell corresponding to the network device 10 (for example, a base station). The cell may belong to a macro base station or may belong to a base station corresponding to a small cell. The small cells herein may include a metro cell, a micro cell, a pico cell, a femto cell, and the like. These small cells are characterized by small coverage and low transmit power and are applicable to providing a high-rate data transmission service.

Figure 2:
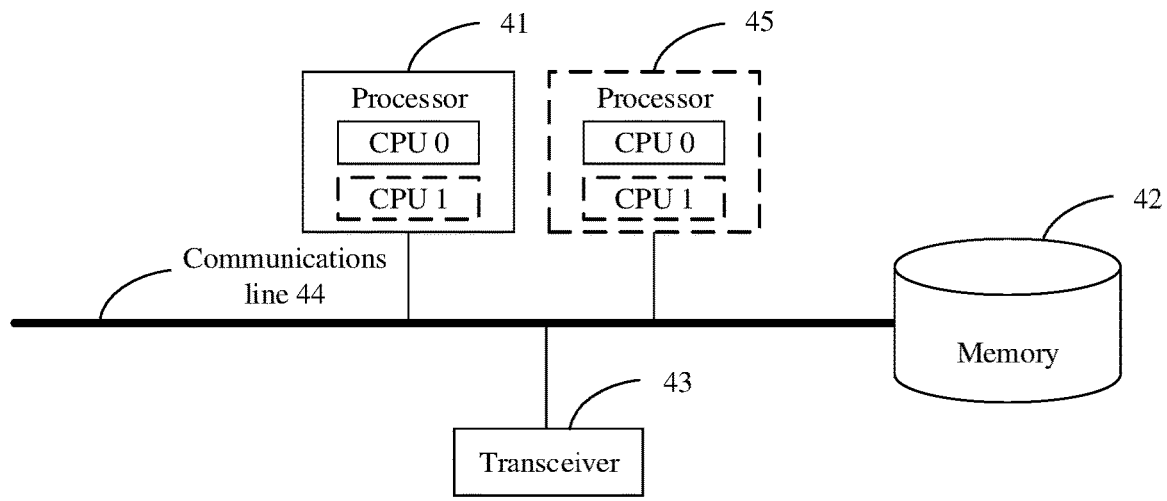
FIG. 2 is a schematic structural diagram of a communications device according to an embodiment.

FIG. 2 is a schematic diagram of a hardware structure of a communications device according to an embodiment. For hardware structures of the first terminal 20, the second terminal 30, and the network device 10 in this embodiment, refer to the structure shown in FIG. 2. The communications device includes a processor 41, a communications line 44, and at least one transceiver (descriptions are provided merely by using an example in which the communications device includes a transceiver 43 in FIG. 2).

The processor 41 may be a general-purpose central processing unit (CPU), a microprocessor, an application-specific integrated circuit (ASIC), or one or more integrated circuits configured to control program execution of the solutions.

The communications line 44 may include a channel for transmitting information between the foregoing components.

The transceiver 43 is configured to communicate with another device or a communications network such as the Ethernet, a radio access network (RAN), or a wireless local area network (WLAN).

Optionally, the communications device may further include a memory 42.

The memory 42 may be a read-only memory (ROM) or another type of static storage device that can store static information and an instruction, or a random access memory (RAM) or another type of dynamic storage device that can store information and an instruction. The memory 42 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 42 is not limited thereto. The memory may exist independently and is connected to the processor 41 through the communications line 44. Alternatively, the memory may be integrated into the processor 41.

The memory 42 is configured to store computer execution instructions for performing the solutions, and the processor 41 controls execution of the computer execution instructions. The processor 41 is configured to execute the computer execution instructions stored in the memory 42, to implement a policy control method provided in the following embodiment.

Optionally, the computer execution instructions in this embodiment may also be referred to as application program code. This is not limited in this embodiment.

In an embodiment, the processor 41 may include one or more CPUs, for example, a CPU 0 and a CPU 1 in FIG. 2.

In an embodiment, the communications device may include a plurality of processors, for example, a processor 41 and a processor 45 in FIG. 2. Each of the processors 41/45 may be a single-core processor (single-CPU) or a multi-core processor (multi-CPU). The processor 41/45 herein may be one or more devices, circuits, and/or processing cores configured to process data (for example, computer program instructions).

Figure 4:
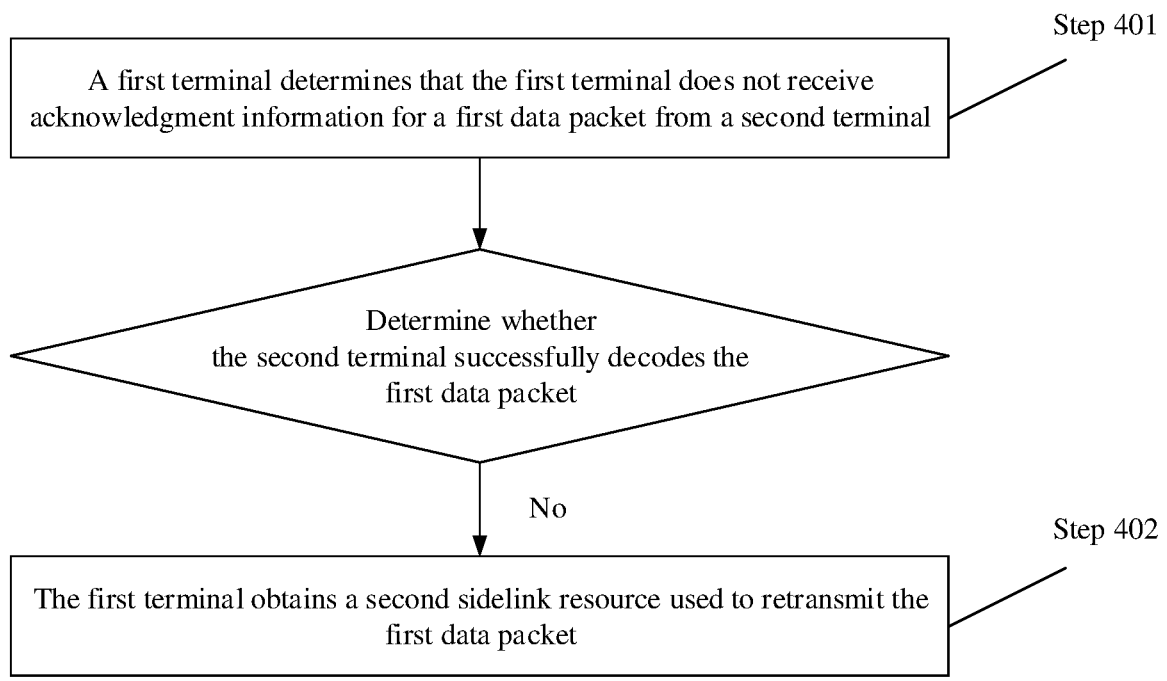
Figure 5A:
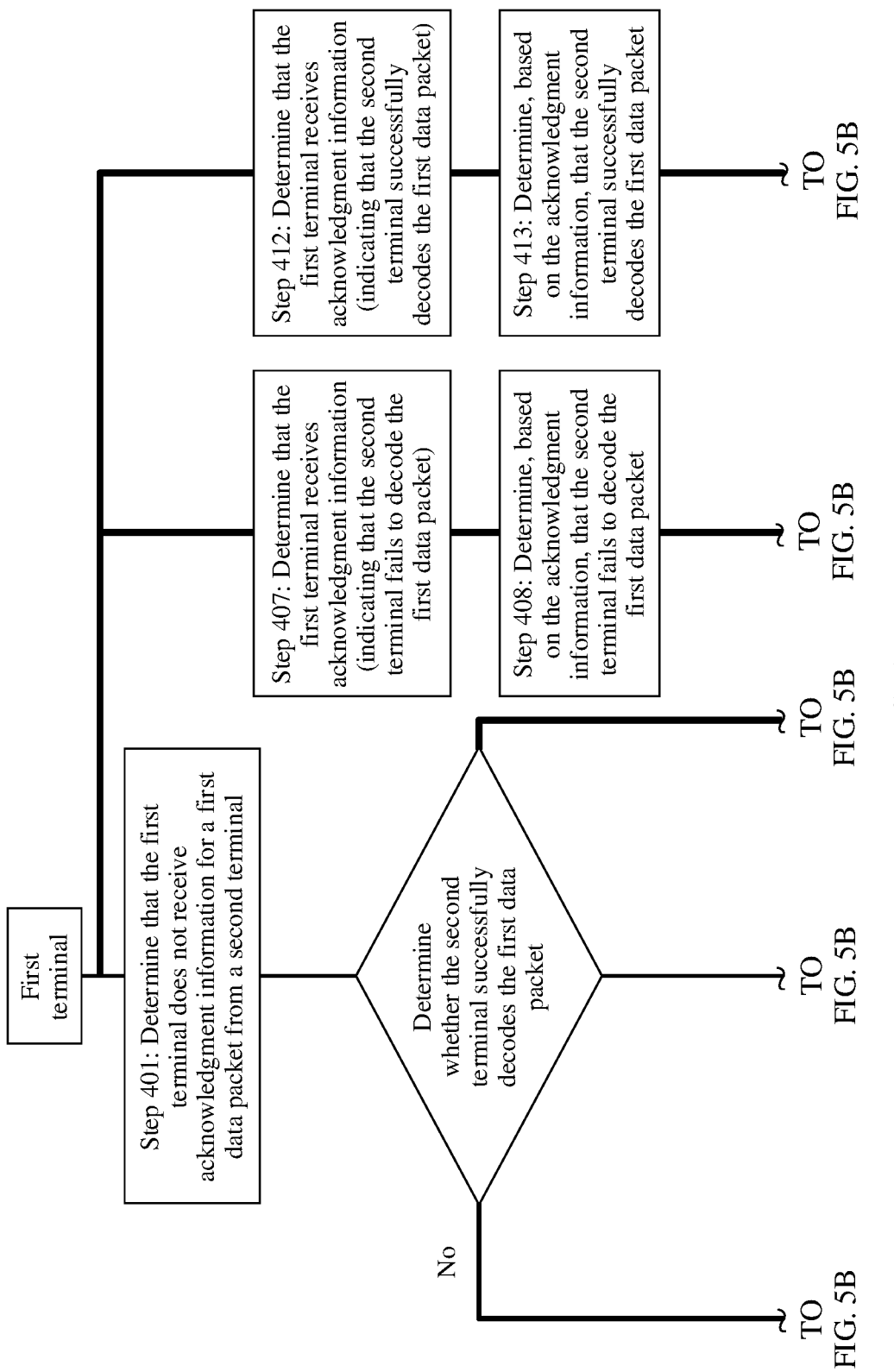

The following describes, in detail with reference to FIG. 4 and FIG. 5A and FIG. 5B, a sidelink resource determining method provided in the embodiments.

It should be noted that in the following embodiments, names of messages between network elements, names of parameters in messages, or the like are merely examples.

It should be noted that mutual reference may be made between the embodiments. For example, for same or similar steps, mutual reference may be made between the method embodiments, the communications system embodiments, and the apparatus embodiments. This is not limited.

Figure 3A:
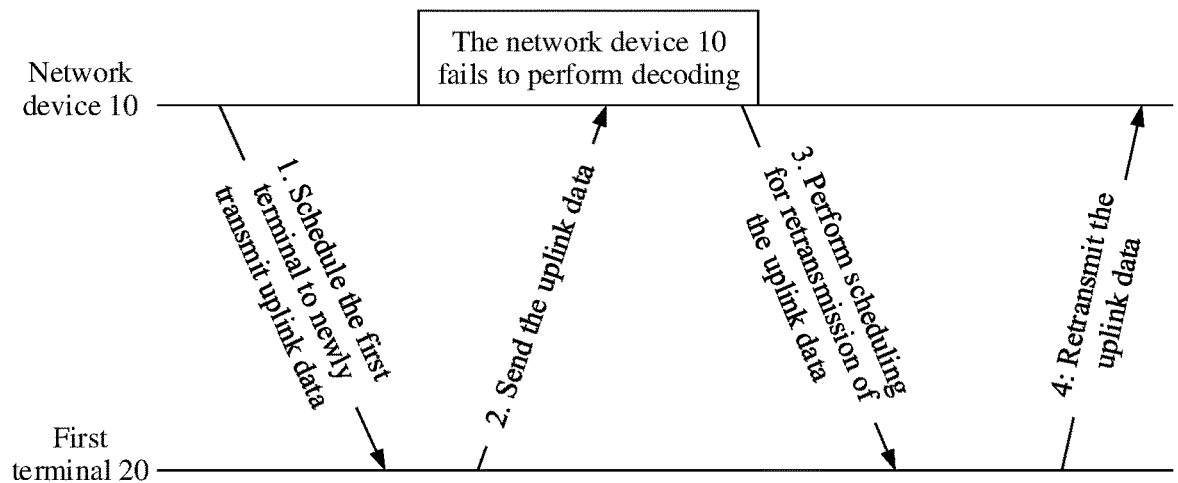
FIG. 3a to FIG. 3d each are a schematic diagram of feeding back acknowledgment information between a network device and a terminal.

As shown in FIG. 3a, on a Uu link, HARQ retransmission is performed on data, to ensure reliability of data transmission between a terminal and a network device. As shown in FIG. 3a, a basic HARQ process for uplink data transmission on the Uu link is as follows: 1. A network device 10 sends a physical downlink control channel (PDCCH) to a first terminal 20, where the PDCCH is used to schedule the first terminal 20 to transmit new uplink data. 2. The first terminal 20 sends uplink data to the network device 10. 3. After the network device 10 receives the uplink data, if the network device 10 fails to decode the uplink data, the network device 10 sends a PDCCH to the first terminal 20, where the PDCCH is used to schedule the first terminal 20 to retransmit the uplink data that fails to be decoded by the network device 10 in the foregoing step. 4. After determining a location of the retransmission resource based on the PDCCH, the first terminal 20 retransmits the uplink data on the retransmission resource.

Figure 3B:
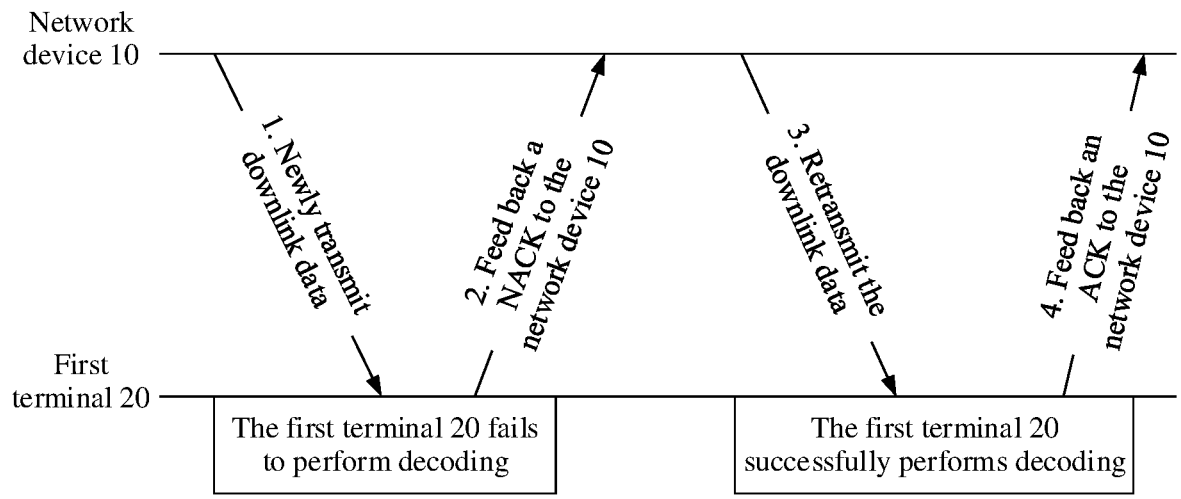

As shown in FIG. 3b, a basic HARQ process for downlink data transmission on the Uu link is as follows: 1. A network device 10 sends downlink data to a first terminal 20. 2. After the first terminal 20 receives the downlink data, if the downlink data fails to be decoded, the first terminal 20 feeds back a NACK to the network device 10. 3. After receiving the NACK, the network device 10 retransmits the downlink data, so that the first terminal 20 re-receives the downlink data on a new physical downlink shared channel (PDSCH) according to a retransmission indication. The network device 10 retransmits the downlink data. 4. After the first terminal 20 receives the downlink data, if the downlink data is successfully decoded, the first terminal 20 feeds back an ACK to the network device 10.

That the network device 10 retransmits the downlink data includes: The network device 10 uses a PDCCH to indicate a resource location of the PDSCH, where the PDSCH carries the retransmitted downlink data.

Figure 3C:
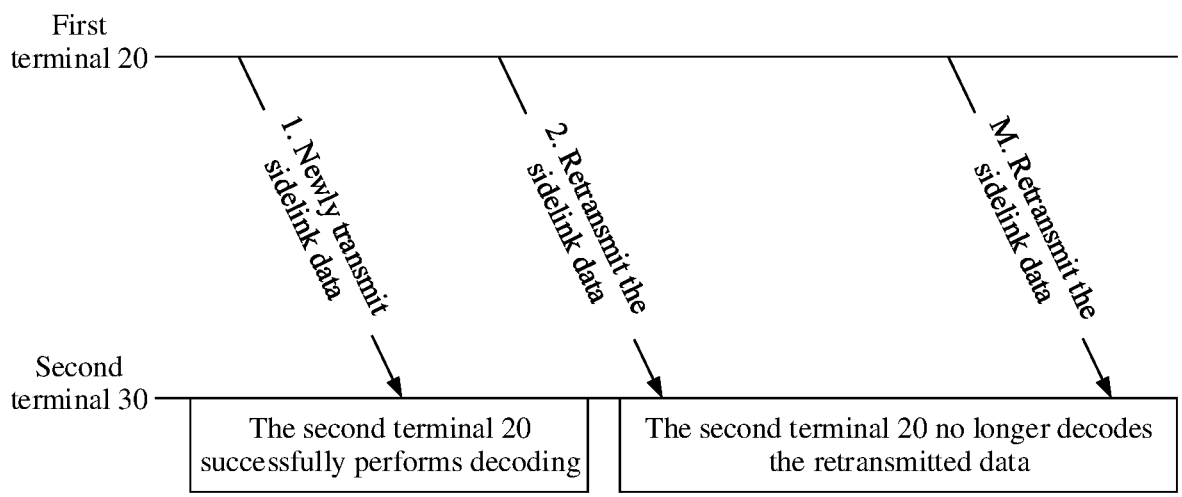

Currently, in an LTE system, as shown in FIG. 3c, a basic HARQ process for sidelink data transmission is as follows: 1. A first terminal 20 sends sidelink data (including newly transmitted data and retransmitted data) to a second terminal 30. 2. The second terminal 30 decodes the sidelink data. Currently, in the LTE system, the first terminal 20 sends the sidelink data in a broadcast manner. Therefore, regardless of whether the second terminal 30 successfully decodes the sidelink data, the second terminal 30 does not send an ACK feedback/a NACK feedback to the first terminal 20. Because the first terminal 20 does not receive the ACK fed back by the second terminal 30, the first terminal 20 may mistakenly consider that the second terminal 30 fails to decode the sidelink data, and in a subsequent process, may continue to retransmit the sidelink data to the second terminal 30 in steps 2 to M. However, because the second terminal 30 has successfully decoded the sidelink data, the second terminal 30 no longer decodes the retransmitted sidelink data. In this way, the first terminal 20 repeatedly sends the sidelink data, causing a waste of sidelink resources.

Figure 3D:
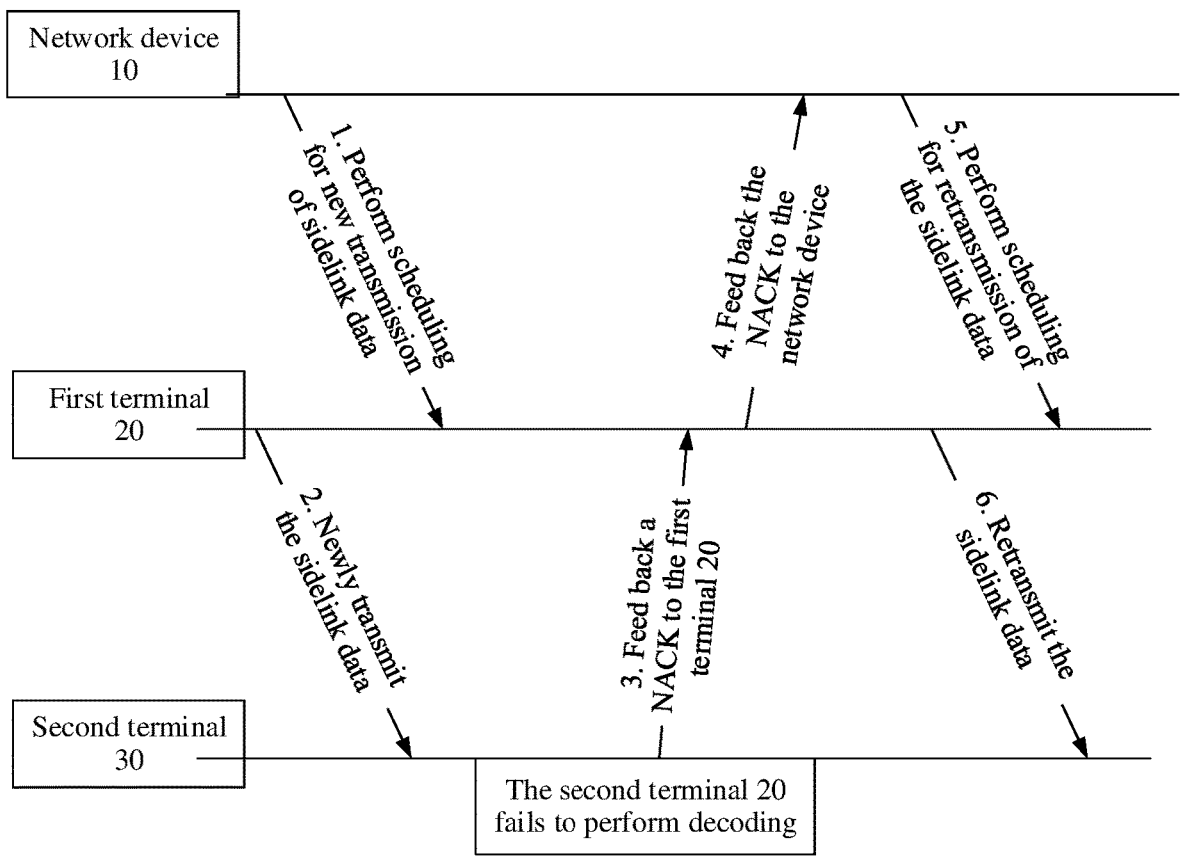

In an NR system, a sidelink supports unicast transmission, multicast transmission, and broadcast transmission. A retransmission mechanism based on a HARQ feedback is supported for unicast transmission and multicast transmission. In a resource allocation manner based on scheduling by a network device 10, as shown in FIG. 3d, a HARQ process for sidelink data transmission is as follows:

1. The network device 10 sends a PDCCH to a first terminal 20, to schedule the first terminal 20 to newly transmit sidelink data. 2. The first terminal 20 sends sidelink data to a second terminal 30. 3. After the second terminal 30 receives the sidelink data, if the sidelink data fails to be decoded, the second terminal 30 feeds back a NACK to the first terminal 20. 4. The first terminal 20 feeds back the NACK to the network device 10. 5. The network device 10 sends a PDCCH to the first terminal 20, to schedule the first terminal 20 to resend the sidelink data that fails to be decoded by the second terminal 30 to the second terminal 30, that is, retransmit the sidelink data. 6. The first terminal 20 retransmits the sidelink.

However, the first terminal 20 may not receive acknowledgment information fed back by the second terminal 30. In this case, the first terminal 20 may not determine whether the second terminal 30 correctly receives the sidelink data. Further, the first terminal 20 does not determine how to subsequently process the sidelink data.

An embodiment provides a sidelink resource determining method. The method is performed by a first communications apparatus. The first communications apparatus may be the first terminal 20 or a chip disposed in the first terminal 20. A second communications apparatus in the method may be the second terminal 30 or a chip disposed in the second terminal 30. In the following embodiments, for example, the first communications apparatus is the first terminal 20, and the second communications apparatus is the second terminal 30.

FIG. 4 shows a sidelink resource determining method according to an embodiment. The method includes the following steps.

Step 401: A first terminal 20 determines that the first terminal 20 does not receive acknowledgment information for a first data packet from a second terminal 30, where the acknowledgment information is used to indicate whether the second terminal 30 successfully decodes the first data packet, and the first data packet is a data packet transmitted by the first terminal 20 on a first sidelink resource.

For example, the acknowledgment information in this embodiment may also be referred to as sidelink HARQ information. For example, the acknowledgment information may be an ACK, or the acknowledgment information in this embodiment may be a NACK. The ACK is used to indicate that the second terminal 30 successfully decodes the first data packet, and the NACK is used to indicate that the second terminal 30 fails to decode the first data packet.

It may be understood that in this embodiment, successful decoding may also be replaced with successful receiving. In this embodiment, failed decoding may also be replaced with failed receiving. In the following embodiments, successful decoding and failed decoding are used as examples.

In this embodiment, the first sidelink resource is a sidelink resource that is configured by a network device 10 for the first terminal 20 and that is used to transmit the first data packet. Alternatively, the first sidelink resource is a sidelink resource that is selected by the first terminal 20 from a sidelink resource pool and that is used to transmit the first data packet.

It may be understood that the first data packet may be a newly transmitted data packet. The newly transmitted data packet is a data packet transmitted by the first terminal 20 to the second terminal 30 for the first time. Alternatively, the first data packet is a retransmitted data packet. The retransmitted data packet is a data packet transmitted by the first terminal 2 to the second terminal 30 for the $M^{th}$ time. In other words, the retransmitted data packet is a data packet that is not transmitted by the first terminal 20 to the second terminal 30 for the first time. M is an integer greater than or equal to 2, and M is less than or equal to a maximum quantity of times of retransmission performed by the first terminal 20. Alternatively, M is less than or equal to a maximum quantity of times of retransmission of the first data packet in a sidelink HARQ process.

Step 402: When the first terminal 20 determines that the second terminal 30 fails to decode the first data packet, the first terminal 20 obtains a second sidelink resource used to retransmit the first data packet.

The second sidelink resource may be a sidelink resource independently selected by the first terminal 20, or the second sidelink resource may be a sidelink resource configured by a network device 10 for the first terminal 20.

In another embodiment, after step 402, the method provided in this embodiment further includes: The first terminal 20 retransmits the first data packet to the second terminal 30 on the second sidelink resource.

Correspondingly, the second terminal 30 may re-receive the first data packet on the second sidelink resource.

An embodiment provides a sidelink resource determining method. In an actual process, a first terminal 20 may fail to send a first data packet to a second terminal 30 at a moment at which the first data packet needs to be sent to the second terminal 30, or a first terminal 20 sends a first data packet to a second terminal 30 and the first terminal 20 does not receive acknowledgment information due to channel quality although the second terminal 30 feeds back the acknowledgment information, or a first terminal 20 sends a first data packet to a second terminal 30 and the second terminal 30 fails to feedback acknowledgment information for the first data packet to the first terminal 20. How the first terminal 20 handles a subsequent data transmission problem when determining that the first terminal 20 does not receive the acknowledgement information is not described in the conventional technology. Consequently, reliability of sidelink transmission may be reduced. In view of this, in this embodiment, when the first terminal 20 determines that the first terminal 20 does not receive the acknowledgment information for the first data packet from the second terminal 30, if the first terminal 20 determines that the second terminal 30 fails to decode the first data packet, the first terminal 20 re-obtains a second sidelink resource used to transmit the first data packet, so that the first terminal 20 can subsequently retransmit the first data packet on the second sidelink resource. In this way, reliability of sidelink transmission is improved.

Step 401 in this embodiment may be implemented in either of Case 1 or Case 2.

Case 1: The first terminal 20 needs to send the first data packet to the second terminal 30 at a moment n by using the first sidelink resource on a sidelink, but the first terminal 20 actually does not send the first data packet to the second terminal 30 at the moment n. In this case, the first terminal 20 determines that the first terminal 20 does not receive the acknowledgment information for the first data packet from the second terminal 30.

The moment n is a moment at which the first terminal 20 needs to send the first data packet. The sidelink is a link between the first terminal 20 and the second terminal 30.

For example, if a moment at which the first terminal 20 sends the first data packet is the same as or conflicts with a moment at which the first terminal 20 sends uplink data or an uplink message to the network device 10, the first terminal 20 gives up sending the first data packet to the second terminal 30. In this case, the first terminal 20 determines that the first terminal 20 does not receive the acknowledgment information for the first data packet from the second terminal 30.

For example, if a moment at which the first terminal 20 sends the first data packet is the same as a moment at which the first terminal 20 sends uplink data or an uplink message to the network device 10, and a priority of a sidelink channel that carries the first data packet is lower than a priority of a physical uplink channel that carries the uplink data or the uplink message, the first terminal 20 gives up sending the first data packet to the second terminal 30.

Case 2: The first terminal 20 sends the first data packet to the second terminal 30 at a moment n by using the first sidelink resource on a sidelink, and the first terminal 20 does not receive the acknowledgment information for the first data packet from the second terminal 30. In this case, the first terminal 20 determines that the first terminal 20 does not receive the acknowledgment information for the first data packet from the second terminal 30.

It may be understood that in Case 2 in which the second terminal 30 receives the first data packet, regardless of whether the second terminal 30 successfully decodes the first data packet, the second terminal 30 generates a NACK or an ACK as the acknowledgment information. Although the second terminal 30 feeds back the NACK or the ACK to the first terminal 20 as the acknowledgment information, due to quality of a channel for transmitting the NACK or the ACK, the first terminal 20 does not receive the NACK or the ACK. In this case, the first terminal 20 determines that the first terminal 20 does not receive the acknowledgment information for the first data packet from the second terminal 30. In addition, if a moment at which the second terminal 30 feeds back the NACK or the ACK to the first terminal 20 as the acknowledgment information is the same as or conflicts with a moment at which the second terminal 30 sends uplink data or an uplink message to another terminal or the network device, the second terminal 30 gives up feeding back the NACK or the ACK to the first terminal 20. Consequently, the ACK/NACK is not sent. In this case, the first terminal 20 determines that the first terminal 20 does not receive the acknowledgment information for the first data packet from the second terminal 30.

In this embodiment, the first terminal 20 may independently select the second sidelink resource from a sidelink resource pool. Certainly, the first terminal 20 may alternatively trigger the network device 10, so that the network device 10 determines the second sidelink resource. Descriptions are separately provided below.

Example (1): Manner in Which the First Terminal 20 Independently Selects a Sidelink Resource In another embodiment, as shown in FIG. 5A and FIG. 5B, in this embodiment, that the first terminal 20 obtains a sidelink resource used to retransmit the first data packet includes the following steps.

Step 4021: The first terminal 20 triggers resource reselection in a sidelink HARQ process associated with the first data packet.

In a possible implementation, step 4021 may be implemented in the following manner When the first terminal 20 determines that the second terminal 30 fails to decode the first data packet, the first terminal 20 triggers resource reselection at a moment n. This implementation is applicable to a case in which the first terminal 20 does not send the first data packet to the second terminal 30 at the moment n. The moment n is a moment at which the first terminal 20 sends the first data packet.

In another possible implementation, step 4021 may be implemented in the following manner. When the first terminal 20 determines that the second terminal 30 fails to decode the first data packet, the first terminal 20 triggers resource reselection after a moment n. This implementation is applicable to a case in which the first terminal 20 does not send the first data packet to the second terminal 30 at the moment n.

In still another possible implementation, step 4021 may be implemented in the following manner. When the first terminal 20 determines that the second terminal 30 fails to decode the first data packet, the first terminal 20 triggers resource reselection at a moment n+x. Herein, X is an interval between a time at which the first terminal 20 sends the first data packet and a time at which the first terminal 20 receives the acknowledgment information fed back by the second terminal 30. This manner is applicable to a process in which the first terminal 20 does not receive the acknowledgment information sent by the second terminal 30 after the first terminal 20 sends the first data packet to the first terminal 20 at a moment n.

Step 4022: The first terminal 20 selects the second sidelink resource from the sidelink resource pool.

In an example, the sidelink resource pool in this embodiment may be a sidelink resource preconfigured by the first terminal 20. The first terminal 20 may select, from the sidelink resource pool, a sidelink resource used to retransmit or newly transmit a data packet on the sidelink.

In another example, the sidelink resource pool in this embodiment may be configured by the network device 10 for the first terminal 20 by using a system message or dedicated signaling.

Example (2): Manner in Which the Network Device 10 Schedules a Sidelink Resource for the First Terminal 20

Figure 6A:
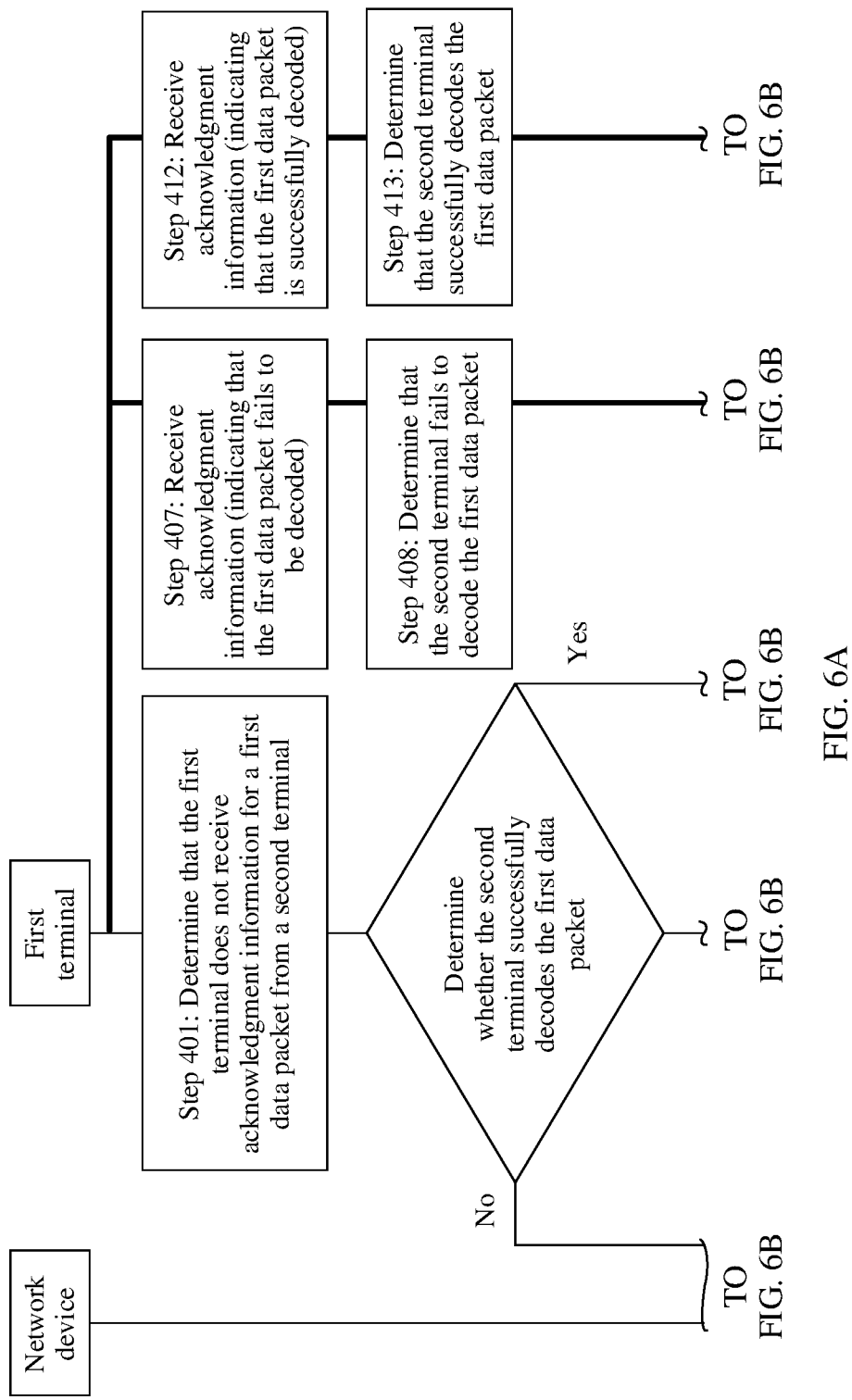

In another embodiment, as shown in FIG. 6A, FIG. 6B, and FIG. 6C, before step 402, the method provided in this embodiment further includes the following steps.

Step 403: The network device 10 sends a first configuration message to the first terminal 20, where the first configuration message includes a sidelink resource associated with the sidelink HARQ process. For example, the first configuration information includes information used to determine a sidelink resource location and a HARQ process number corresponding to the sidelink resource.

The network device 10 may actively send the first configuration message to the first terminal 20, or the network device 10 may send the first configuration message to the first terminal 20 after being triggered by the first terminal 20.

Step 404: The first terminal 20 receives the first configuration message from the network device 10.

Correspondingly, in this embodiment, the first terminal 20 may obtain, in the following manner, the sidelink resource used to retransmit the first data packet: The first terminal 20 determines the sidelink resource associated with the sidelink HARQ process as the second sidelink resource.

Example (2-1): The first terminal 20 triggers the network device 10 to send the first configuration message.

If the network device 10 sends the first configuration message to the first terminal 20 after being triggered by the first terminal 20, before step 403, the method provided in this embodiment may further include the following steps.

Step 405a: The first terminal 20 feeds back first indication information to the network device 10, where the first indication information indicates that the second terminal 30 fails to decode the first data packet.

HARQ acknowledgment information fed back by the first terminal 20 to the network device 10 in a sidelink HARQ process m may be a NACK. A MAC layer of the first terminal 20 indicates a PHY layer to generate the acknowledgment information NACK, or a MAC layer generates the acknowledgment information NACK and then indicates the NACK to a PHY layer, so that the PHY layer sends the NACK to the network device 10.

Step 406: The network device 10 receives the first indication information from the first terminal 20.

The first indication information may be used to indicate, to the network device 10, that the first data packet in the sidelink HARQ fails to be decoded by the second terminal 30. For example, the first indication information may be used to indicate the sidelink HARQ process number and the NACK, so that the network device 10 determines that the first data packet in the sidelink HARQ fails to be decoded by the second terminal 30.

In step 405a, when the first terminal 20 sends the first indication information to the network device 10, the network device 10 may determine, based on the first indication information, that the second terminal 30 fails to decode the first data packet, so that the network device 10 can subsequently allocate the second sidelink resource used for retransmission to the first terminal 20.

Example (2-2): The first terminal 20 does not trigger the network device 10 to send the first configuration message.

When the network device 10 may actively send the first configuration message to the first terminal 20, in other words, when the first terminal 20 does not trigger the network device 10 to send the first configuration message, before step 4025, the method in this embodiment further includes the following step:

Step 405b: The first terminal 20 does not feedback first indication information to the network device 10. In this case, the network device 10 cannot receive the first indication information on a resource used to feed back the first indication information. If the first terminal 20 and the network device 10 negotiate with each other in advance, and the first terminal 20 determines that the first data packet fails to be decoded, the first terminal 20 may not need to send the first indication information to the network device 10. In this way, uplink resources used to transmit the first indication information can be saved. In other words, if the first terminal 20 does not send the first indication information to the network device 10, the network device 10 may consider by default that the second terminal 30 fails to decode the first data packet, and the network device 10 may subsequently determine that the second sidelink resource used for retransmission needs to be allocated to the first terminal 20.

A MAC layer of the first terminal 20 may not indicate a PHY layer of the first terminal 20 to generate the acknowledgment information, or a MAC layer of the first terminal 20 generates the NACK but does not indicate the NACK to a physical layer of the first terminal 20.

It should be understood that Example (2-1) and Example (2-2) are applicable to a case in which the first terminal 20 determines, in a manner in either of Case 1 or Case 2, that the first terminal 20 does not receive the acknowledgment information from the second terminal 30.

Correspondingly, in this embodiment, the first terminal 20 may obtain, in the following manner, the sidelink resource used to retransmit the first data packet: The first terminal 20 determines the sidelink resource associated with the sidelink HARQ process as the second sidelink resource.

Regardless of whether the first terminal 20 independently selects the second sidelink resource or the network device 10 configures the second sidelink resource for the first terminal 20, as shown in FIG. 5A and FIG. 5B or FIG. 6A, FIG. 6B, and FIG. 6C, in this embodiment, the first terminal 20 may determine, in the following manners, that the second terminal 30 fails to decode the first data packet.

Manner 1: When the first terminal 20 does not receive the acknowledgment information from the second terminal 30 after the first terminal 20 sends the first data packet to the second terminal 30, the first terminal 20 determines that the second terminal 30 fails to decode the first data packet.

In a possible implementation of this embodiment, when the first terminal 20 does not receive the acknowledgment information from the second terminal 30 after the first terminal 20 sends the first data packet to the second terminal 30, if the first terminal 20 determines that the first data packet needs to be retransmitted, the first terminal 20 determines that the second terminal 30 fails to decode the first data packet. That is, when determining that the first data packet needs to be retransmitted, the first terminal 20 performs step 4021.

Manner 2: When a first condition is met, and the first terminal 20 does not receive the acknowledgment information from the second terminal 30 after the first terminal 20 sends the first data packet to the second terminal 30, the first terminal 20 determines that the second terminal 30 fails to decode the first data packet. The first condition includes any one or more of the following: That retransmission is required is configured for a first sidelink logical channel in the first data packet, where the first sidelink logical channel is a sidelink logical channel with a highest priority in the first data packet; that retransmission is required is configured for the first terminal; and the first terminal 20 determines that a random number generated within a first preset range is greater than a first threshold.

It should be understood that in this embodiment, when determining that the first condition is met, the first terminal 20 may determine that the first data packet needs to be retransmitted.

For example, the first terminal 20 has the first threshold. The first threshold may be configured by the network device 10 for the first terminal 20, or the first threshold may be preconfigured. The first preset range may be [0, 1]. Optionally, the first threshold may be configured by the network device 10 for the first terminal 20 by using system information or dedicated signaling.

For example, in an implementation 1, the network device 10 may configure one piece of indication information for each of one or more sidelink logical channels of the first terminal 20. The indication information is used to indicate whether a MAC SDU of a sidelink logical channel needs to be retransmitted when the first terminal 20 does not receive acknowledgment information that is in the sidelink HARQ process m and that is fed back by the second terminal 30 after the first terminal 20 sends a first data packet in a sidelink HARQ process m, namely, an SL MAC PDU, where the SL MAC PDU includes the MAC SDU of the sidelink logical channel. When the foregoing case occurs, the first terminal 20 determines, based on the indication information indicating that a sidelink logical channel with a highest priority in the SL MAC PDU in the sidelink HARQ process m is configured, whether retransmission needs to be performed. Optionally, the indication information may be configured by using system information or dedicated signaling. The SL MAC PDU in the sidelink HARQ process includes SL MAC SDUs from one or more sidelink logical channels. The first sidelink logical channel is a sidelink logical channel with the highest priority in the one or more sidelink logical channels.

For example, the indication information may be a third value or a fourth value. The third value is used to indicate that a data packet on the sidelink logical channel needs to be transmitted. The fourth value is used to indicate that a data packet on the sidelink logical channel does not need to be transmitted.

For example, in an implementation 2, the network device 10 configures one piece of indication information p for the first terminal 20. The indication information p is used to indicate whether an SL MAC PDU needs to be retransmitted when the first terminal 20 does not receive acknowledgment information that is in the sidelink HARQ process m and that is fed back by the second terminal 30 after the first terminal 20 sends the SL MAC PDU in a sidelink HARQ process m. When the foregoing case occurs, the first terminal 20 determines, based on the indication information p configured for the first terminal 20, whether retransmission needs to be performed. Optionally, the indication information p may be configured by using system information or dedicated signaling.

The indication information p may be a fifth value or a sixth value. The fifth value is used to indicate that when the first terminal 20 does not receive the acknowledgment information fed back by the second terminal 30, the first terminal 20 needs to retransmit the data packet. The sixth value is used to indicate that when the first terminal 20 does not receive the acknowledgment information fed back by the second terminal 30, the first terminal 20 does not need to retransmit the data packet.

A difference between the implementation 1 and the implementation 2 lies in whether to retransmit the data packet in the sidelink HARQ process m in the implementation 1 is based on whether that retransmission is required is configured for the sidelink logical channel with the highest priority in the SL MAC PDU in the sidelink HARQ process m. A data packet in a sidelink HARQ process m of the first terminal 20 may need to be retransmitted, and a data packet in a sidelink HARQ process n of the first terminal 20 may not need to be retransmitted. In other words, that retransmission is required is configured for the sidelink logical channel with the highest priority in the SL MAC PDU in the sidelink HARQ process m, and that no retransmission is required is configured for a sidelink logical channel with a highest priority in an SL MAC PDU in the sidelink HARQ process n.

In the implementation 2, if that data packet retransmission is required is configured for a first terminal 20, when the first terminal 20 does not receive acknowledgment information from the second terminal 30, the first terminal 20 determines that the data packet needs to be retransmitted. If that no data packet retransmission is required is configured for a first terminal 20, when the first terminal 20 does not receive acknowledgment information from the second terminal 30, the first terminal 20 determines that the data packet does not need to be retransmitted. In other words, in the implementation 2, if that retransmission is required is configured for the first terminal, data packets of a plurality of sidelink HARQ processes m of a same first terminal 20 need to be retransmitted when the second terminal 30 fails to decode the data packets. If that no retransmission is required is configured for the first terminal, data packets of a plurality of sidelink HARQ processes m of a same first terminal 20 do not need to be retransmitted when the second terminal 30 fails to decode the data packets.

In an implementation 3, when the first terminal 20 does not receive acknowledgment information that is in the sidelink HARQ process m and that is fed back by the second terminal 30 after the first terminal 20 sends a MAC PDU in a sidelink HARQ process m, the first terminal 20 generates a random number within a range of [0, 1] based on even distribution. If the random number generated within the first preset range is less than the first threshold, the first terminal 20 determines that retransmission does not need to be performed; or if the random number generated within the first preset range is not less than the first threshold, the first terminal 20 determines that retransmission is performed. Alternatively, if the random number generated within the first preset range is greater than the first threshold, the first terminal 20 determines that retransmission does not need to be performed; or if the random number generated within the first preset range is not greater than the first threshold, the first terminal 20 determines that retransmission is performed.

It should be noted that Manner 1 is applicable to Case 2. For Case 1, the first terminal 20 may determine, in the following manner, that the second terminal 30 fails to decode the first data packet. If the first terminal 20 determines that the first terminal 20 does not send the first data packet to the second terminal 30, the first terminal 20 determines that the second terminal 30 fails to decode the first data packet.

In this embodiment, the first terminal 20 maintains one first variable for one or more sidelink HARQ processes of the first terminal 20, and a value of a first variable corresponding to any sidelink HARQ process is used to reflect whether a data packet of the sidelink HARQ process is successfully decoded. If a value of a first variable corresponding to a sidelink HARQ process is a first value, the first value is used to indicate that the second terminal 30 fails to decode the data packet. If a value of a first variable corresponding to a sidelink HARQ process is a second value, the second value is used to indicate that the second terminal 30 successfully decodes the data packet.

The foregoing embodiment mainly describes a process in which when the first terminal 20 does not receive the acknowledgment information for the first data packet from the second terminal 30, if the first terminal 20 determines that the first data packet fails to be decoded, the first terminal 20 determines the second sidelink resource. However, in an actual process, the first terminal 20 may alternatively receive the acknowledgment information for the first data packet from the second terminal 30. In this case, as shown in FIG. 5A and FIG. 5B or FIG. 6A, FIG. 6B, and FIG. 6C, the method provided in this embodiment includes the following steps.

Step 407: The first terminal 20 receives the acknowledgment information for the first data packet from the second terminal 30, where the acknowledgement information indicates that the second terminal 30 fails to decode the first data packet, and the first data packet is a data packet transmitted by the first terminal 20 on a first sidelink resource.

Correspondingly, before step 407, the method provided in this embodiment further includes: The first terminal 20 sends the first data packet to the second terminal 30 on the first sidelink resource.

For example, the acknowledgment information that is for the first data packet and that is received by the first terminal 20 from the second terminal 30 is a NACK.

Step 408: The first terminal 20 determines, based on the acknowledgment information, that the second terminal 30 fails to decode the first data packet.

A case in which the first terminal 20 receives acknowledgment information NACK that is for a sidelink HARQ process and that is fed back by the second terminal 30 is as follows:

If the first terminal 20 has reserved the second sidelink resource used for retransmission in the sidelink HARQ process, the first terminal 20 needs to trigger retransmission of the second sidelink resource. Optionally, the first terminal 20 sets a value of a first variable corresponding to the sidelink HARQ process to a first value.

In addition, the first terminal 20 sends first indication information to the network device. Optionally, the first terminal 20 sets a value of a first variable corresponding to the sidelink HARQ process to a first value.

It should be noted that in this embodiment, if the first terminal 20 receives the acknowledgment information for the first data packet from the second terminal 30, where the acknowledgment information indicates that the second terminal 30 fails to decode the first data packet, the first terminal 20 further needs to perform step 402. As shown in FIG. 5A and FIG. 5B, if the first terminal 20 independently selects the second sidelink resource, step 402 may be implemented in step 4021 and step 4022. As shown in FIG. 6A, FIG. 6B, and FIG. 6C, if the second sidelink resource is scheduled by the network device 10 for the first terminal 20, the first terminal 20 further needs to perform step 405a, step 406, step 403, and step 404.

Regardless of whether the first terminal 20 receives the acknowledgment information for the first data packet from the second terminal 30, when the first terminal 20 determines that the second terminal 30 fails to decode the first data packet, in a possible embodiment, the first data packet is transmitted in the sidelink HARQ process. With reference to FIG. 5A and FIG. 5B or FIG. 6A, FIG. 6B, and FIG. 6C, the method provided in this embodiment further includes the following step:

Step 409: The first terminal 20 determines that the value of the first variable corresponding to the sidelink HARQ process is the first value.

The first variable is used to record the acknowledgment information that is in the sidelink HARQ process and that is fed back by the second terminal 30.

When the first terminal 20 receives the acknowledgment information NACK that is for the sidelink HARQ process and that is fed back by the second terminal 30, the first terminal 20 sets the value of the first variable corresponding to the sidelink HARQ process to the first value, and the first terminal 20 feeds back the HARQ acknowledgment information NACK for the sidelink HARQ process to the network device 10, or does not feedback the NACK.

When the first terminal 20 does not receive the acknowledgment information that is in the sidelink HARQ process and that is fed back by the second terminal 30, if the first terminal 20 determines, in the foregoing manner, that the second terminal 30 fails to decode the first data packet, the first terminal 20 automatically sets the value of the first variable corresponding to the sidelink HARQ process to the first value, and the first terminal 20 feeds back the HARQ acknowledgment information NACK for the sidelink HARQ process to the network device 10, or does not feedback the NACK.

For Case 1, step 409 in this embodiment of this embodiment may be implemented in the following manners.

Implementation 2-1: When a MAC entity of the first terminal 20 determines that a sidelink MAC PDU in the sidelink HARQ process cannot be transmitted, the MAC entity of the first terminal 20 automatically sets the value of the first variable corresponding to the sidelink HARQ process to the first value.

Implementation 2-2: When a PHY layer of the first terminal 20 determines that transmission of a physical sidelink shared channel (PSSCH) scheduled by the network device 10 at a moment n is not performed, the PHY layer of the first terminal 20 automatically generates the NACK at a moment n+Y and submits the NACK to a MAC entity. After receiving the NACK information, the MAC entity sets the value of the first variable corresponding to the sidelink HARQ process to the first value. Herein, Y is an interval between a time at which the first terminal 20 sends the PSSCH and a time at which the second terminal 30 feeds back the corresponding ACK/NACK information through a physical sidelink feedback channel (PSFCH).

For Case 2, step 409 in this embodiment of this embodiment may be implemented in the following manners.

Implementation 3-1: When a MAC entity of the first terminal 20 determines that the acknowledgment information in the sidelink HARQ process is not received, the MAC entity of the first terminal 20 automatically sets the value of the first variable corresponding to the sidelink HARQ process to the first value, or the first terminal 20 determines, based on a first condition, that the value of the first variable is set to the first value. In other words, if the MAC entity of the first terminal 20 determines that the acknowledgment information in the sidelink HARQ process is not received, and the first data packet in the sidelink HARQ process needs to be retransmitted, the MAC entity of the first terminal 20 automatically sets the value of the first variable corresponding to the sidelink HARQ process to the first value. If the MAC entity of the first terminal 20 determines that the acknowledgment information in the sidelink HARQ process is not received, and the first data packet in the sidelink HARQ process does not need to be retransmitted, the MAC entity of the first terminal 20 automatically sets the value of the first variable corresponding to the sidelink HARQ process to a second value.

Implementation 3-2: After a PHY layer of the first terminal 20 transmits the first data packet in the sidelink HARQ process at a moment n, if the PHY layer of the first terminal 20 does not receive the acknowledgment information in the sidelink HARQ process at a moment n+X, the PHY layer of the first terminal 20 automatically generates the NACK, and submits the NACK to a MAC entity of the first terminal 20. After receiving the NACK, the MAC entity of the first terminal 20 sets the value of the first variable corresponding to the sidelink HARQ process to the first value.

The foregoing embodiment mainly describes a process in which when the first terminal 20 does not receive the acknowledgment information for the first data packet from the second terminal 30, or the first terminal 20 receives the acknowledgment information for the first data packet from the second terminal 30, if the first terminal 20 determines that the first data packet fails to be decoded, the first terminal 20 determines the second sidelink resource. However, in an actual process, the first terminal 20 may alternatively determine that the first data packet is successfully decoded. In this case, as shown in FIG. 6A, FIG. 6B, and FIG. 6C, the method provided in this embodiment may further include step 410. Alternatively, as shown in FIG. 5A and FIG. 5B, the method provided in this embodiment may further include step 411.

Step 410: When the first terminal 20 determines that the second terminal 30 successfully decodes the first data packet, the first terminal 20 sends or does not send second indication information to the network device 10, where the second indication information is used to indicate that the second terminal 30 successfully decodes the first data packet.

For example, the second indication information may be an ACK. Optionally, the second indication information may further include information used to indicate a process number of the sidelink HARQ process.

In step 410, when the first terminal 20 sends the second indication information to the network device 10, the network device 10 may determine, based on the second indication information, that the second terminal 30 successfully decodes the first data packet. In this way, the network device 10 can subsequently no longer allocate the second sidelink resource used for retransmission to the first terminal 20.

If the first terminal 20 and the network device 10 negotiate with each other in advance, and the first terminal 20 determines that the first data packet is successfully decoded, the first terminal 20 may not need to send the second indication information to the network device 10, so that uplink resources used to transmit the second indication information can be saved. In other words, if the first terminal 20 does not send the second indication information to the network device 10, the network device 10 may consider by default that the second terminal 30 successfully decodes the first data packet. Subsequently, the network device 10 may not need to allocate the second sidelink resource used for retransmission to the first terminal 20.

Step 411: When the first terminal 20 determines that the second terminal 30 successfully decodes the first data packet, the first terminal 20 releases the second sidelink resource, where the second sidelink resource is a sidelink resource used to retransmit the first data packet, and the second sidelink resource is allocated by the network device 10, or is a sidelink resource reserved by the first terminal 20 in a sidelink resource pool.

A difference between step 410 and step 411 lies in that step 410 is applicable to a case in which the network device 10 allocates the sidelink resource to the first terminal 20, and step 411 is applicable to a case in which the first terminal 20 independently selects the sidelink resource. Certainly, step 407 may alternatively be implemented in the following manner. When the first terminal 20 determines that the second terminal 30 successfully decodes the first data packet, the first terminal 20 transmits a second data packet on the second sidelink resource. In other words, the first terminal 20 performs new transmission on the second sidelink resource, or transmits, on the second sidelink resource, another data packet that fails to be decoded.

For Case 1, when the first terminal 20 receives the acknowledgment information ACK that is for the sidelink HARQ process and that is fed back by the second terminal 30, if the second terminal 30 has reserved the second sidelink resource used for retransmission in the sidelink HARQ process, the first terminal 20 releases the reserved second sidelink resource.

In addition, for Case 2, when the first terminal 20 does not receive the acknowledgment information from the second terminal 30, if the first terminal 20 determines that the second terminal 30 successfully decodes the first data packet, and the second terminal 30 has reserved the second sidelink resource used for retransmission in the sidelink HARQ process, the first terminal 20 releases the reserved second sidelink resource.

In a possible implementation, in step 410 or step 411, that the first terminal 20 determines that the second terminal 30 successfully decodes the first data packet includes: When the first terminal 20 does not receive the acknowledgment information from the second terminal 30 after the first terminal 20 sends the first data packet to the second terminal 30, the first terminal 20 determines that the second terminal 30 successfully decodes the first data packet.

In other words, for Case 2, if the first terminal 20 determines that the first terminal 20 does not receive the acknowledgment information from the second terminal 30, the first terminal 20 may determine that the second terminal 30 successfully decodes the first data packet.

When a second condition is met, and the first terminal 20 does not receive the acknowledgment information from the second terminal 30 after the first terminal 20 sends the first data packet to the second terminal 30, the first terminal 20 determines that the second terminal 30 successfully decodes the first data packet, to improve accuracy of determining, by the first terminal 20, that the second terminal 30 successfully decodes the first data packet. The second condition includes any one of the following: That no retransmission is required is configured for a first sidelink logical channel in the first data packet, where the first sidelink logical channel is a sidelink logical channel with a highest priority in the first data packet; that no retransmission is required is configured for the first terminal; and the first terminal 20 determines that a random number generated within a second preset range is less than a second threshold.

If the first terminal 20 determines that a first condition is not met, and the first terminal 20 does not receive the acknowledgment information from the second terminal 30 after the first terminal 20 sends the first data packet to the second terminal 30, the first terminal 20 determines that the second terminal 30 successfully decodes the first data packet. In other words, for Case 2, if the first terminal 20 determines that the first data packet does not need to be retransmitted, the first terminal 20 determines that the second terminal 30 successfully decodes the first data packet.

For example, the first terminal 20 has the second threshold. The second threshold may be configured by the network device 10 for the first terminal 20, or the second threshold may be preconfigured. The second preset range may be [0, 1]. Optionally, the second threshold may be configured by the network device 10 for the first terminal 20 by using system information or dedicated signaling. The second threshold and the first threshold may be the same or different.

For example, with reference to the implementation 1, if the indication information is the fourth value, when the first terminal 20 does not receive the acknowledgment information from the second terminal 30 after the first terminal 20 sends the first data packet to the second terminal 30, the first terminal 20 determines that the second terminal 30 successfully decodes the first data packet.

For example, with reference to the implementation 2, if the indication information is the sixth value, when the first terminal 20 does not receive the acknowledgment information from the second terminal 30 after the first terminal 20 sends the first data packet to the second terminal 30, the first terminal 20 determines that the second terminal 30 successfully decodes the first data packet.

For example, with reference to the implementation 3, when the first terminal 20 does not receive the acknowledgment information that is in the sidelink HARQ process m and that is fed back by the second terminal 30 after the first terminal 20 sends the MAC PDU in the sidelink HARQ process m, the first terminal 20 generates a random number within a range of [0, 1] based on even distribution. If the random number generated within the second preset range is greater than the second threshold, the first terminal 20 determines that retransmission does not need to be performed, and the first terminal 20 determines that the second terminal 30 successfully decodes the first data packet.

For Case 1, in the method provided in this embodiment, in another embodiment, as shown in FIG. 5A and FIG. 5B or FIG. 6A, FIG. 6B, and FIG. 6C, the method provided in this embodiment further includes the following steps.

Step 412: The first terminal 20 receives the acknowledgment information for the first data packet from the second terminal 30, where the acknowledgment information indicates that the second terminal 30 successfully decodes the first data packet.

For example, the acknowledgment information in step 412 is an ACK.

Step 413: The first terminal 20 determines, based on the acknowledgment information, that the second terminal 30 successfully decodes the first data packet.

It should be noted that in this embodiment, if the first terminal 20 receives the acknowledgment information for the first data packet from the second terminal 30, where the acknowledgment information indicates that the second terminal 30 successfully decodes the first data packet, as shown in FIG. 5A and FIG. 5B, the first terminal 20 further needs to perform step 410. As shown in FIG. 6A, FIG. 6B, and FIG. 6C, the first terminal 20 further needs to perform step 411.

Regardless of whether the first terminal 20 receives the acknowledgment information, when the first terminal 20 determines that the second terminal 30 successfully decodes the first data packet, in another embodiment, as shown in FIG. 5A and FIG. 5B or FIG. 6A, FIG. 6B, and FIG. 6C, the method provided in this embodiment further includes the following steps.

Step 414: The first terminal 20 determines that a value of a first variable corresponding to a sidelink HARQ process is a second value, where the second value is used to indicate that the second terminal 30 successfully decodes the first data packet.

A case in which the first terminal 20 receives acknowledgment information ACK that is for a sidelink HARQ process and that is fed back by the second terminal 30 is as follows:

If the first terminal 20 has reserved the second sidelink resource used for retransmission in the sidelink HARQ process, the first terminal 20 releases the second sidelink resource. Optionally, the first terminal 20 sets the value of the first variable corresponding to the sidelink HARQ process to the second value.

In addition, the first terminal 20 sends second indication information to the network device. Optionally, the first terminal 20 sets the value of the first variable corresponding to the sidelink HARQ process to the second value.

It should be noted that in this embodiment, step 401, step 4021, step 4022, and step 409 may be used as an independent embodiment, to implement a solution in which when the first terminal 20 does not receive the acknowledgment information, and determines that the second terminal 30 fails to decode the first data packet, the first terminal 20 obtains, in an independent selection manner, the sidelink resource used for retransmission.

It should be noted that in this embodiment, step 401, step 405a, step 405b, step 406, step 403, step 404, step 402, and step 409 may be used as an independent embodiment, to implement a solution in which when the first terminal 20 does not receive the acknowledgment information, and determines that the second terminal 30 fails to decode the first data packet, the first terminal 20 re-obtains, in a scheduling manner of the network device 10, the sidelink resource used for retransmission.

In this embodiment, step 401, step 411, and step 414 may be used as an independent embodiment, to implement a solution in which when the first terminal 20 does not receive the acknowledgment information and determines that the second terminal 30 successfully decodes the first data packet, if the first terminal 20 re-receives the second sidelink resource used to retransmit the first data packet, the first terminal 20 releases the second sidelink resource.

In this embodiment, step 401, step 410, step 411, and step 414 may be used as an independent embodiment, to implement a solution in which when the first terminal 20 does not receive the acknowledgment information, and determines that the second terminal 30 successfully decodes the first data packet, if the first terminal 20 re-receives the second sidelink resource used to retransmit the first data packet, the first terminal 20 releases the second sidelink resource.

In this embodiment, step 407, step 408, step 4021, step 4022, and step 409 may be used as an independent embodiment, to implement a solution in which when the first terminal 20 receives the acknowledgment information, and determines that the second terminal 30 fails to decode the first data packet, the first terminal 20 obtains, in an independent selection manner, the sidelink resource used for retransmission.

In this embodiment, step 412, step 413, step 411, and step 414 may be used as an independent embodiment, to implement a solution in which when the first terminal 20 receives the acknowledgment information and determines that the second terminal 30 successfully decodes the first data packet, if the first terminal 20 re-receives the second sidelink resource used to retransmit the first data packet, the first terminal 20 releases the second sidelink resource.

In this embodiment, step 407, step 408, step 405a, step 405b, step 406, step 403, step 404, step 402, and step 409 may be used as an independent embodiment, to implement a solution in which when the first terminal 20 receives the acknowledgment information, and determines that the second terminal 30 fails to decode the first data packet, the first terminal 20 re-obtains, in a scheduling manner of the network device 10, the sidelink resource used for retransmission.

In this embodiment, step 412, step 413, step 410, step 411, and step 414 may be used as an independent embodiment, to implement a solution in which when the first terminal 20 receives the acknowledgment information and determines that the second terminal 30 successfully decodes the first data packet, if the first terminal 20 re-receives the second sidelink resource used to retransmit the first data packet, the first terminal 20 releases the second sidelink resource.

The foregoing described solutions may alternatively be implemented as a whole. This is not limited in the embodiments.

When the solutions described in the embodiments are applied to a V2X scenario, the solutions may be applied to the following fields unmanned driving, automated driving (ADS), driver assistance (ADAS), intelligent driving, connected driving, intelligent network driving, and car sharing.

The foregoing mainly describes the solutions in the embodiments from a perspective of interaction between the network elements. It may be understood that to implement the foregoing functions, each network element such as the first terminal 20 includes corresponding hardware structures and/or software modules for performing the functions. A person skilled in the art should be easily aware that units, algorithms, and steps in the examples described with reference to the embodiments can be implemented in a form of hardware or a combination of hardware and computer software. Whether a function is performed by hardware or hardware driven by computer software depends on design constraints of the solutions. A person skilled in the art may use different methods to implement the described functions, but it should not be considered that the implementation goes beyond the scope.

In the embodiments, the first terminal 20 may be divided into function units based on the foregoing method examples. For example, each function unit may be obtained through division based on each corresponding function, or two or more functions may be integrated into one processing unit. The integrated unit may be implemented in a form of hardware or may be implemented in a form of a software function unit. It should be noted that in the embodiments, division into the units is an example and is merely logical function division and may be other division in an actual implementation.

The foregoing describes the methods in the embodiments with reference to FIG. 1 to FIG. 6A, FIG. 6B, and FIG. 6C. The following describes sidelink resource determining apparatuses that perform the foregoing methods and that are provided in embodiments. A person skilled in the art may understand that the method and the apparatus may be mutually combined and referenced. A sidelink resource determining apparatus provided in an embodiment may perform the steps performed by the first terminal 20 in the foregoing sidelink resource determining method.

Figure 7:
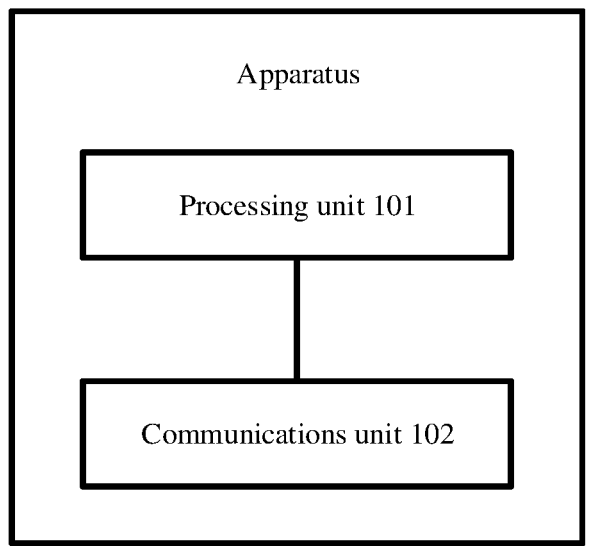
FIG. 7 is a schematic structural diagram of a communications apparatus according to an embodiment.

When an integrated unit is used, FIG. 7 shows a sidelink resource determining apparatus in the foregoing embodiment. The sidelink resource determining apparatus may include a processing unit 101. Optionally, the apparatus may further include a communications unit 102.

The sidelink resource determining apparatus is a first terminal, or a chip applied to the first terminal. In this case, the processing unit 101 is configured to support the sidelink resource determining apparatus in performing step 401 and step 402 in FIG. 4 that are performed by the first terminal 20 in the foregoing embodiment.

In a possible embodiment, the processing unit 101 is further configured to support the sidelink resource determining apparatus in performing step 4021, step 4022, step 407, step 408, step 412, step 413, step 409, step 411, step 414, step 409, and step 410 that are performed by the first terminal 20 in the foregoing embodiment.

In a possible embodiment, the communications unit 102 is configured to support the sidelink resource determining apparatus in performing step 405a, step 404, and step 405b that are performed by the first terminal 20 in the foregoing embodiment.

Figure 8:
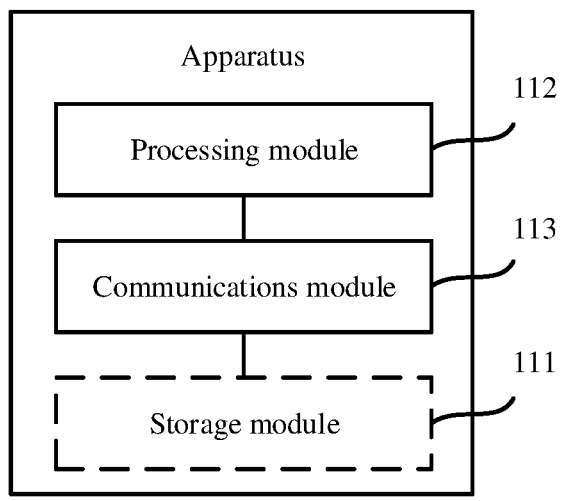
FIG. 8 is a schematic structural diagram of another communications apparatus according to an embodiment.

When an integrated unit is used, FIG. 8 is a possible schematic diagram of a logical structure of a sidelink resource determining apparatus in the foregoing embodiment. The sidelink resource determining apparatus includes a processing module 112 and a communications module 113. The processing module 112 is configured to: control and manage an action of the sidelink resource determining apparatus. For example, the processing module 112 is configured to perform the step of processing information/data by the sidelink resource determining apparatus. The communications module 113 is configured to support the sidelink resource determining apparatus in performing the step of sending or receiving information/data.

In a possible embodiment, the sidelink resource determining apparatus may further include a storage module 111, configured to store program code and data that can be used by the sidelink resource determining apparatus.

The sidelink resource determining apparatus is a first terminal, or a chip applied to the first terminal. In this case, the processing module 112 is configured to support the sidelink resource determining apparatus in performing step 401 and step 402 in FIG. 4 that are performed by the first terminal 20 in the foregoing embodiment.

In a possible embodiment, the processing module 112 is further configured to support the sidelink resource determining apparatus in performing step 4021, step 4022, step 407, step 408, step 412, step 413, step 409, step 411, step 414, step 409, and step 410 that are performed by the first terminal 20 in the foregoing embodiment.

In a possible embodiment, the communications module 113 is configured to support the sidelink resource determining apparatus in performing step 405a, step 404, and step 405b that are performed by the first terminal 20 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processor may implement or execute various example logical blocks, modules, and circuits described with reference to content disclosed. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

When the processing module 112 is the processor 41 or the processor 45, the communications module 113 is the transceiver 43, and the storage module 111 is the memory 42, the sidelink resource determining apparatus may be the communications device shown in FIG. 2.

The communications device shown in FIG. 2 is a first terminal, or a chip applied to the first terminal. In this case, the processor 41 and the processor 45 are configured to support the communications device shown in FIG. 2 in performing step 401 and step 402 in FIG. 4 that are performed by the first terminal 20 in the foregoing embodiment.

In a possible embodiment, the processor 41 and the processor 45 are further configured to support the communications device shown in FIG. 2 in performing step 4021, step 4022, step 407, step 408, step 412, step 413, step 409, step 411, step 414, step 409, and step 410 that are performed by the first terminal 20 in the foregoing embodiment.

In a possible embodiment, the transceiver 43 is configured to support the communications device shown in FIG. 2 in performing step 405a, step 404, and step 405b that are performed by the first terminal 20 in the foregoing embodiment.

Figure 9:
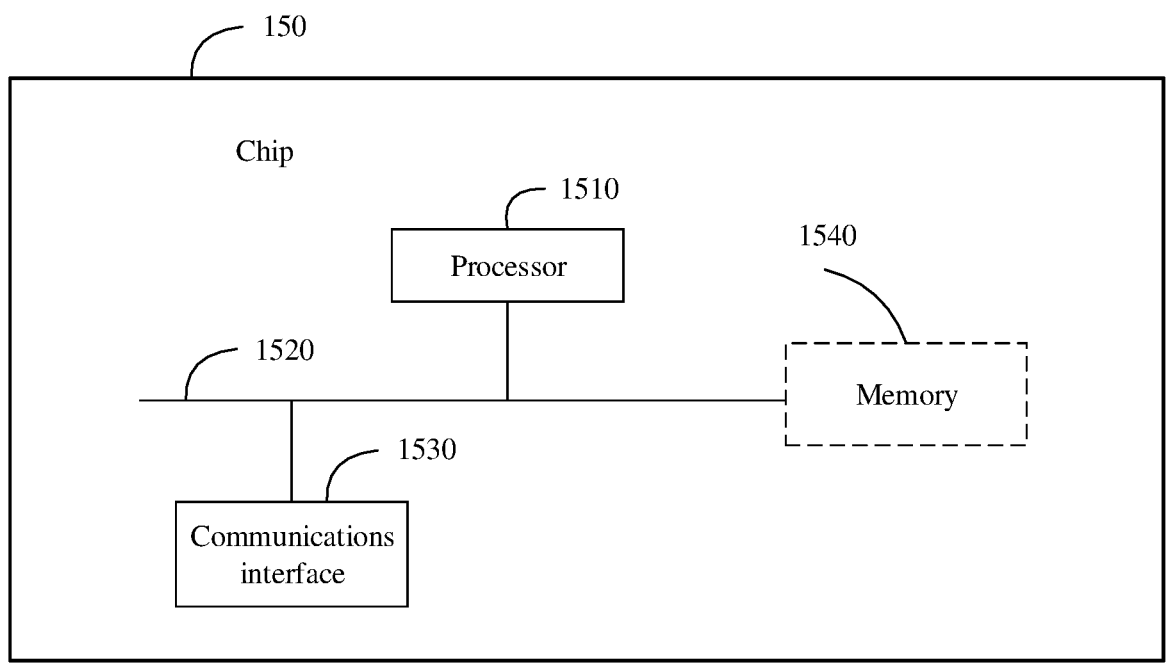
FIG. 9 is a schematic structural diagram of a chip according to an embodiment.

FIG. 9 is a schematic structural diagram of a chip 150 according to an embodiment. The chip 150 includes one or more processors 1510 and a communications interface 1530.

Optionally, the chip 150 further includes a memory 1540. The memory 1540 may include a read-only memory and a random access memory and provide operation instructions and data for the processor 1510. A part of the memory 1540 may further include a non-volatile random access memory (NVRAM).

In some implementations, the memory 1540 stores the following elements: an execution module or a data structure, a subset thereof, or an extended set thereof.

In this embodiment, a corresponding operation is performed by invoking the operation instructions (where the operation instructions may be stored in an operating system) stored in the memory 1540.

In a possible implementation, first terminals may use a similar chip structure, and different apparatuses may use different chips to implement respective functions.

The processor 1510 controls a processing operation of any one of the first terminals, and the processor 1510 may also be referred to as a central processing unit (CPU).

The memory 1540 may include a read-only memory and a random access memory and provide instructions and data for the processor 1510. A part of the memory 1540 may further include an NVRAM. For example, the memory 1540, the communications interface 1530, and the memory 1540 may be coupled together through a bus system 1520. The bus system 1520 may include a power bus, a control bus, a status signal bus, and the like in addition to a data bus. However, for clear descriptions, various buses are marked as the bus system 1520 in FIG. 9.

The methods disclosed in the foregoing embodiments may be applied to the processor 1510 or may be implemented by the processor 1510. The processor 1510 may be an integrated circuit chip and has a signal processing capability. In an implementation process, steps in the foregoing method may be implemented by using a hardware integrated logical circuit in the processor 1510, or by using an instruction in a form of software. The processor 1510 may be a general-purpose processor, a digital signal processor (DSP), an ASIC, a field-programmable gate array (FPGA) or another programmable logic device, a discrete gate or a transistor logic device, or a discrete hardware component. The processor 1510 may implement or perform the methods, the steps, and logical block diagrams that are disclosed in the embodiments. The general-purpose processor may be a microprocessor, or the processor may be any conventional processor or the like. The steps of the methods disclosed with reference to the embodiments may be directly presented as being performed and completed by a hardware decoding processor or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communications interface 1530 is configured to perform the receiving and sending steps of the first terminal 20 in the embodiments shown in FIG. 4 to FIG. 6A, FIG. 6B, and FIG. 6C. The processor 1510 is configured to perform the processing steps of the first terminal 20 in the embodiments shown in FIG. 4 to FIG. 6A, FIG. 6B, and FIG. 6C.

The foregoing communications unit may be a communications interface of the apparatus and is configured to receive a signal from another apparatus. For example, when the apparatus is implemented as a chip, the communications unit is a communications interface that is of the chip and that is configured to receive a signal from another chip or apparatus or send a signal.

An embodiment provides a computer readable storage medium. The computer readable storage medium stores instructions, and when the instructions are run, a function of the first terminal 20 in FIG. 4, FIG. 5A and FIG. 5B, or FIG. 6A, FIG. 6B, and FIG. 6C is implemented.

An embodiment provides a computer program product including instructions. The computer program product includes the instructions, and when the instructions are run, a function of the first terminal 20 in FIG. 4, FIG. 5A and FIG. 5B, or FIG. 6A, FIG. 6B, and FIG. 6C is implemented.

An embodiment provides a chip. The chip is applied to a first terminal. The chip includes at least one processor and a communications interface, the communications interface is coupled to the at least one processor, and the processor is configured to run instructions, to implement a function of the first terminal 20 in FIG. 4, FIG. 5A and FIG. 5B, or FIG. 6A, FIG. 6B, and FIG. 6C.

An embodiment provides a communications system. The communications system includes a first terminal 20, a second terminal 30, and a network device 10. The first terminal 20 is configured to perform the steps performed by the first terminal 20 in FIG. 4 to FIG. 6A, FIG. 6B, and FIG. 6C, and the network device 10 is configured to perform the steps performed by the network device 10 in FIG. 4 to FIG. 6A, FIG. 6B, and FIG. 6C.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of procedures or functions in the embodiments are performed. The computer may be a general-purpose computer, a dedicated computer, a computer network, a network device, user equipment, or another programmable apparatus. The computer programs or the instructions may be stored in a computer readable storage medium or may be transmitted from a computer readable storage medium to another computer readable storage medium. For example, the computer programs or the instructions may be transmitted from a website, computer, server, or data center to another website, computer, server, or data center in a wired or wireless manner. The computer readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid state drive (SSD).

A person skilled in the art may understand and implement another variation of the disclosed embodiments by viewing the accompanying drawings, disclosed content, and the appended claims. In the claims, "comprising (comprising)" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

Although features and the embodiments thereof are described, it is clear that various modifications and combinations may be made without departing from the spirit and scope. Correspondingly, the embodiments and drawings are merely examples for description, and are considered as any or all of modifications, variations, combinations, or equivalents that cover the scope. It is clear that a person of ordinary skill in the art can make various modifications and variations without departing from the spirit and scope.

What is claimed is:

1. A method, comprising:
    sending, by a first communications apparatus, a first data packet to a second communications apparatus via a first sidelink resource, wherein the first sidelink resource is a sidelink resource configured by a network device for the first communications apparatus;
    determining, by the first communications apparatus, that the second communications apparatus fails to decode the first data packet, when the first communications apparatus does not receive either acknowledgment (ACK) or negative acknowledgment (NACK) for the first data packet from the second communications apparatus;
    feeding back, by the first communications apparatus, first indication information to the network device indicates that the second communications apparatus fails to decode the first data packet;
    receiving, by the first communications apparatus, a first configuration message from the network device, wherein the first configuration message comprises a second sidelink resource associated with a sidelink hybrid automatic repeat request (HARQ) process;
    after receiving the first configuration message, using, by the first communications apparatus, the second sidelink resource associated with the sidelink HARQ process to retransmit the first data packet to the second communications apparatus.

2. The method according to claim 1, wherein the determining, by the first communications apparatus, that the second communications apparatus fails to decode the first data packet, when the first communications apparatus does not receive either acknowledgment (ACK) or negative acknowledgment (NACK) for the first data packet from the second communications apparatus further comprises:
    when a first condition is met, and the first communications apparatus does not receive either the ACK or the NACK for the first data packet from the second communications apparatus after the first communications apparatus sends the first data packet to the second communications apparatus using the first sidelink resource, determining, by the first communications apparatus, that the second communications apparatus fails to decode the first data packet, wherein the first condition comprises any one or more of the following:
    that retransmission is required is configured for a first sidelink logical channel in the first data packet, wherein the first sidelink logical channel is a sidelink logical channel with a highest priority in the first data packet;
    that retransmission is required is configured for the first communications apparatus; or
    the first communications apparatus determines that a random number generated by the first communications apparatus within a first preset range is greater than a first threshold.

3. The method according to claim 1, wherein the method further comprises:
    determining, by the first communications apparatus, that a value of a first variable corresponding to the sidelink HARQ process is a first value, wherein the first value is usable for indicating that the second communications apparatus fails to decode the first data packet.

4. The method according to claim 1, wherein the method further comprises:
  determining, by the first communications apparatus, that the second communications apparatus successfully decodes the first data packet, when the first communications apparatus receives the ACK for the first data packet from the second communications apparatus;
  sending, by the first communications apparatus, second indication information to the network device, wherein the second indication information indicates that the second communications apparatus successfully decodes the first data packet.

5. The method according to claim 4, wherein the method further comprises:
  releasing, by the first communications apparatus, the second sidelink resource, after determining, by the first communications apparatus, that the second communications apparatus successfully decodes the first data packet; and
  determining, by the first communications apparatus, that a value of a first variable corresponding to the sidelink HARQ process is a second value, wherein the second value indicates that the second communications apparatus successfully decodes the first data packet.

6. The method according to claim 1, wherein
  the second sidelink resource is allocated by the network device, or the second sidelink resource is a sidelink resource reserved by the first communications apparatus in a sidelink resource pool.

7. A communications apparatus comprising:
  a processor; and
  a memory coupled to the processor and configured to store computer readable instructions that, when executed by the processor, cause the processor to perform steps comprising:
    sending a first data packet to a second communications apparatus via a first sidelink resource, wherein the first sidelink resource is a sidelink resource configured by a network device for the communications apparatus;
    determining that the second communications apparatus fails to decode the first data packet when the communications apparatus does not receive either acknowledgment (ACK) or negative acknowledgment (NACK) for the first data packet from the second communications apparatus;
    feeding back first indication information to the network device, wherein the first indication information indicates that the second communications apparatus fails to decode the first data packet;
    receiving a first configuration message from the network device, wherein the first configuration message comprises a second sidelink resource associated with a sidelink hybrid automatic repeat request (HARQ) process;
    after receiving the first configuration message, using the second sidelink resource associated with the sidelink HARQ process to retransmit the first data packet to the second communications apparatus.

8. The communications apparatus according to claim 7, wherein the determining that the second communications apparatus fails to decode the first data packet when the communications apparatus does not receive either acknowledgment (ACK) or negative acknowledgment (NACK) for the first data packet from the second communications apparatus further comprises:
  when a first condition is met, and the communications apparatus does not receive either the ACK or the NACK for the first data packet from the second communications apparatus after the communications apparatus sends the first data packet to the second communications apparatus using the first sidelink resource, determining that the second communications apparatus fails to decode the first data packet, wherein the first condition comprises any one or more of the following:
  that retransmission is required is configured for a first sidelink logical channel in the first data packet, wherein the first sidelink logical channel is a sidelink logical channel with a highest priority in the first data packet;
  that retransmission is required is configured for the communications apparatus; or
  the communications apparatus determines that a random number generated by the communications apparatus within a first preset range is greater than a first threshold.

9. The communications apparatus according to claim 7, wherein the processor is further caused to perform steps of:
  determining that a value of a first variable corresponding to the sidelink HARQ process is a first value, wherein the first value is usable for indicating that the second communications apparatus fails to decode the first data packet.

10. The communications apparatus according to claim 7, wherein the processor is further caused to perform steps of:
  determining that the second communications apparatus successfully decodes the first data packet when the communications apparatus receives the ACK for the first data packet from the second communications apparatus; and
  sending second indication information to the network device, wherein the second indication information indicates that the second communications apparatus successfully decodes the first data packet.

11. The communications apparatus according to claim 7, wherein the second sidelink resource is allocated by the network device, or the second sidelink resource is a sidelink resource reserved by the communications apparatus in a sidelink resource pool.

12. The communications apparatus according to claim 7, wherein the processor is further caused to perform steps of:
  releasing the second sidelink resource after determining that the second communications apparatus successfully decodes the first data packet; and
  determining that a value of a first variable corresponding to the sidelink HARQ process is a second value, wherein the second value indicates that the second communications apparatus successfully decodes the first data packet.

13. A non-transitory computer readable storage medium, wherein the non-transitory computer readable storage medium stores instructions, and when the instructions are run, a first communications apparatus is caused to perform steps of:
  sending a first data packet to a second communications apparatus via a first sidelink resource, wherein the first sidelink resource is a sidelink resource configured by a network device for the first communications apparatus;
  determining that the second communications apparatus fails to decode the first data packet when the first communications apparatus does not receive either acknowledgment (ACK) or negative acknowledgment (NACK) for the first data packet from the second communications apparatus;

feeding back first indication information to the network device, wherein the first indication information indicates that the second communications apparatus fails to decode the first data packet;

receiving a first configuration message from the network device, wherein the first configuration message comprises a second sidelink resource associated with a sidelink hybrid automatic repeat request (HARQ) process;

after receiving the first configuration message, using the second sidelink resource associated with the sidelink HARQ process to retransmit the first data packet to the second communications apparatus.

14. The non-transitory computer readable storage medium according to claim 13, wherein the determining that the second communications apparatus fails to decode the first data packet when the first communications apparatus does not receive either acknowledgment (ACK) or negative acknowledgment (NACK) for the first data packet from the second communications apparatus further comprises:

when a first condition is met, and the first communications apparatus does not receive either the ACK or the NACK for the first data packet from the second communications apparatus after the first communications apparatus sends the first data packet to the second communications apparatus using the first sidelink resource, determining that the second communications apparatus fails to decode the first data packet, wherein the first condition comprises any one or more of the following:

that retransmission is required is configured for a first sidelink logical channel in the first data packet, wherein the first sidelink logical channel is a sidelink logical channel with a highest priority in the first data packet;

that retransmission is required is configured for the first communications apparatus; or the first communications apparatus determines that a random number generated by the first communications apparatus within a first preset range is greater than a first threshold.

15. The non-transitory computer readable storage medium according to claim 13, wherein, when the instructions are run, the first communications apparatus is caused to perform a step of:

determining that a value of a first variable corresponding to the sidelink HARQ process is a first value, wherein the first value is usable for indicating that the second communications apparatus fails to decode the first data packet.

16. The non-transitory computer readable storage medium according to claim 13, wherein, when the instructions are run, the first communications apparatus is caused to perform steps of:

determining that the second communications apparatus successfully decodes the first data packet when the first communications apparatus receives the ACK for the first data packet from the second communications apparatus; and sending second indication information to the network device, wherein the second indication information indicates that the second communications apparatus successfully decodes the first data packet.

17. The non-transitory computer readable storage medium according to claim 13, wherein the second sidelink resource is allocated by the network device, or the second sidelink resource is a sidelink resource reserved by the first communications apparatus in a sidelink resource pool.

18. The non-transitory computer readable storage medium according to claim 13, when the instructions are run, the first communications apparatus is caused to perform steps of:

releasing the second sidelink resource after determining that the second communications apparatus successfully decodes the first data packet; and determining that a value of a first variable corresponding to the sidelink HARQ process is a second value, wherein the second value indicates that the second communications apparatus successfully decodes the first data packet.

* * * * *